United States Patent
Koste et al.

(10) Patent No.: US 11,921,991 B2
(45) Date of Patent: Mar. 5, 2024

(54) DATA VISUALIZATION TOOL WITH GUIDED VISUALIZATION CREATION AND SECURE PUBLICATION FEATURES, AND GRAPHICAL USER INTERFACE THEREOF

(71) Applicant: Target Brands, Inc., Minneapolis, MN (US)

(72) Inventors: Robert James Koste, Minneapolis, MN (US); Ryan Schrupp, Minneapolis, MN (US); Jeremy Woelfel, Bradenton, FL (US); Paul Algren, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 197 days.

(21) Appl. No.: 17/581,387

(22) Filed: Jan. 21, 2022

(65) Prior Publication Data
US 2022/0147205 A1     May 12, 2022

Related U.S. Application Data

(63) Continuation-in-part of application No. 16/746,560, filed on Jan. 17, 2020, now Pat. No. 11,847,170.

(51) Int. Cl.
| G06F 16/00 | (2019.01) |
| G06F 3/0482 | (2013.01) |
| G06F 3/0484 | (2022.01) |
| G06F 9/451 | (2018.01) |
| G06F 16/9535 | (2019.01) |

(52) U.S. Cl.
CPC .......... *G06F 3/0484* (2013.01); *G06F 3/0482* (2013.01); *G06F 9/451* (2018.02); *G06F 16/9535* (2019.01)

(58) Field of Classification Search
CPC .................................................. G06F 16/9535
See application file for complete search history.

(56) References Cited

U.S. PATENT DOCUMENTS

| 6,154,766 A | 11/2000 | Yost et al. |
| 7,490,110 B2 | 2/2009 | Ewen et al. |
| 7,559,048 B1 | 7/2009 | Bedell et al. |

(Continued)

OTHER PUBLICATIONS

"AmCharts 4 Demos." Retrieved from the Internet: URL: <https://www.amcharts.com/demos/>. Retrieved on Dec. 27, 2018, 86 pages.

(Continued)

*Primary Examiner* — Ajith Jacob
(74) *Attorney, Agent, or Firm* — Merchant & Gould P.C.

(57) ABSTRACT

Methods and systems for generating and distributing data visualizations are provided. One method includes displaying a user interface including a canvas and a card builder toolset, the card builder toolset including a plurality of selectable options, each of the plurality of selectable options responsive to user input to present a definition screen including one or more card definition parameter input fields. The method further includes receiving user input into the one or more card definition parameter input fields for each of the plurality of selectable options and, in response, defining at least one aspect of a card to be included within a user dashboard presented on the canvas. The method also includes rendering a card within the canvas in accordance with parameters defined by the user input, the card being included within a dashboard to be displayed to users.

20 Claims, 24 Drawing Sheets

(56) References Cited

U.S. PATENT DOCUMENTS

| | | |
|---|---|---|
| 7,925,616 B2 | 4/2011 | Hurwood et al. |
| 8,032,488 B2 | 10/2011 | Lashley et al. |
| D664,981 S | 8/2012 | Rai et al. |
| 8,266,148 B2 | 9/2012 | Guha et al. |
| D678,313 S | 3/2013 | Howes et al. |
| D685,812 S | 7/2013 | Bork et al. |
| 8,566,301 B2 | 10/2013 | Rueben et al. |
| D696,681 S | 12/2013 | Kim et al. |
| D699,260 S | 2/2014 | Lindmark et al. |
| 8,738,543 B2 | 5/2014 | Dang et al. |
| D712,918 S | 9/2014 | Frick et al. |
| 8,860,727 B2 | 10/2014 | Beers et al. |
| D723,048 S | 2/2015 | Helliker et al. |
| 9,081,975 B2 | 7/2015 | Ducott, III et al. |
| 9,116,954 B1 | 8/2015 | Cappiello et al. |
| 9,235,978 B1 | 1/2016 | Charlton |
| 9,292,571 B1 | 3/2016 | Kiryakov et al. |
| 9,413,807 B1 | 8/2016 | Sherman et al. |
| 9,424,318 B2 | 8/2016 | Anand et al. |
| D766,940 S | 9/2016 | Napper et al. |
| D769,908 S | 10/2016 | Cook |
| D785,022 S | 4/2017 | Vazquez et al. |
| 9,613,099 B2 | 4/2017 | Molloy et al. |
| 9,619,115 B2 | 4/2017 | Kim et al. |
| 9,633,076 B1 | 4/2017 | Morton et al. |
| D792,437 S | 7/2017 | Cianflone et al. |
| 9,710,527 B1 | 7/2017 | Sherman |
| D794,665 S | 8/2017 | Willis |
| 9,779,147 B1 | 10/2017 | Sherman et al. |
| 9,792,017 B1 | 10/2017 | Landefeld et al. |
| 9,818,211 B1 | 11/2017 | Gibb et al. |
| 9,836,502 B2 | 12/2017 | Papale et al. |
| 9,846,904 B2 | 12/2017 | Alcott et al. |
| D816,703 S | 5/2018 | Willis et al. |
| D818,476 S | 5/2018 | Hawkins et al. |
| D820,288 S | 6/2018 | Howell et al. |
| D820,292 S | 6/2018 | Mander et al. |
| D820,293 S | 6/2018 | Poel et al. |
| D820,864 S | 6/2018 | Eder |
| D823,328 S | 7/2018 | Durkan et al. |
| D826,972 S | 8/2018 | Madhavan et al. |
| 10,114,867 B2 | 10/2018 | Marcotte et al. |
| 10,176,226 B2 | 1/2019 | Tabb et al. |
| 10,223,099 B2 | 3/2019 | Avant |
| 10,242,079 B2 | 3/2019 | Kim et al. |
| D847,165 S | 4/2019 | Kolbenheyer |
| 10,262,030 B1 | 4/2019 | Burtenshaw et al. |
| D857,056 S | 8/2019 | Lofberg et al. |
| 2004/0254911 A1 | 12/2004 | Grasso et al. |
| 2006/0247948 A1 | 11/2006 | Ellis et al. |
| 2008/0307343 A1 | 12/2008 | Robert et al. |
| 2011/0055202 A1 | 3/2011 | Heimendinger |
| 2012/0324353 A1 | 12/2012 | Torbey et al. |
| 2014/0149839 A1 | 5/2014 | Bedard et al. |
| 2015/0081692 A1 | 3/2015 | Mackinlay et al. |
| 2016/0275152 A1 | 9/2016 | Gunjan |
| 2017/0351407 A1 | 12/2017 | Landefeld et al. |
| 2018/0033180 A1 | 2/2018 | Geddes |
| 2018/0040154 A1 | 2/2018 | Gibb et al. |
| 2018/0067998 A1 | 3/2018 | Sherman et al. |
| 2018/0129720 A1 | 5/2018 | Kim et al. |
| 2018/0165329 A1 | 6/2018 | Tabb et al. |
| 2018/0189294 A1 | 7/2018 | Anand et al. |
| 2018/0322429 A1 | 11/2018 | Nesanelis et al. |
| 2019/0050466 A1 | 2/2019 | Kim et al. |
| 2019/0108272 A1 | 4/2019 | Talbot et al. |
| 2019/0373028 A1 | 12/2019 | Kasula |
| 2021/0224328 A1 | 7/2021 | Schrupp et al. |

OTHER PUBLICATIONS

"Cards." Retrieved from the Internet: URL: <https://declara.com/content/ZaKdnOP1>. Retrieved on Dec. 27, 2018, 43 pages.

Data Visualization WIP—Zubko, https://dribbble.com/shots/2015631-Data-Visualization-WIP, 2 pages (Year: 2015).

"Druid." Retrieved from the Internet: <URL: http://druid.io/druid.html>. Retrieved on Jun. 7, 2017, 2 pages.

"Druid Joins" Retrieved from the Internet: <URL: https://druid.apache.org/docs/latest/querying/joins.html>. Retrieved on Jun. 5, 2019, 2 pages.

"Druid Technology" <URL: https://druid.apache.org/technology>, Retrieved on Jun. 4, 2019, 8 pages.

"Druid Use Cases." Retrieved from the Internet: <URL: https://druid.apache.org/use-cases>. Retrieved on Jun. 4, 2019, 4 pages.

Ggplot GUI, https://web.archive.org/web/20170718141233/https://cran.r-project.org/web/packages/ggplotgui/README.html, 3 pages (Year: 2017).

"Implementing your theme." Retrieved from the Internet: URL: <https://material.io/design/material-theming/implementing-your-theme.html#>. Retrieved on Dec. 27, 2018, 22 pages.

Muthiah et al., "How Druid enables analytics at Airbnb." Retrieved from the Internet: <URL: https://medium.com/airbnb-engineering/druid-airbnb-data-platform-601c312f2a4c>, Nov. 13, 2018, 10 pages.

"Showcase" Retrieved from the Internet: <URL: https://material-ui.com/discover-more/showcase>. Retrieved on Dec. 27, 2018, 18 pages.

FIG. 3

Home

FAVORITES

My cards

★ Data (Prior Day)

| Date | Region | Ad | Ad Comp % |
|---|---|---|---|
| 12-16-2018 | 100 | | ##% |
| 12-16-2018 | 200 | | ##% |
| 12-16-2018 | 300 | | ##% |
| 12-16-2018 | 400 | | ##% |

★ Data Overview

| Store | Sales Dollars | Comp% |
|---|---|---|
| T0003 | $###.### | ##% |
| T0004 | $###.### | ##% |
| T0005 | $###.### | ##% |
| T0012 | $###.### | ##% |
| T0013 | $###.### | ##% |
| T0019 | $###.### | ##% |

★ data year over year

★ Items to Review

No results were found

My Dashboards

★ Dashboard Title
9 cards
SmithJohn
SmithJane

★ Dashboard Title
30 cards
SmithJohn
SmithJane
AdamsAdam

★ Dashboard Title
9 cards
SmithJohn
SmithJane
AdamsAdam

★ Dashboard Title
8 cards
SmithJohn

★ Dashboard Title
19 cards

★ Dashboard Title
6 cards

Builder-edit

\*Tab1

Data by Day [Last 2 weeks]
Data by Day
□ value

Data by Merch Group
Data by Merch Group
◇ APPAREL/ACCESS
◇ ESSENTIALS/BEAUTY
◇ FOOD/BEVERAGE
◇ HARDLINES
◇ HOME

Data w/ Conditional Formatting
Conditional Formatting

| Sales Date | Data% |
|---|---|
| 12-03-2018 | ###% |
| 12-04-2018 | ###% |
| 12-05-2018 | ###% |
| 12-06-2018 | ###% |

Previous | Page 1 of 1 | Next

Data (Prior Day)
Data (Multi Dimension)

| Date | Region | Data% |
|---|---|---|
| 12-16-2018 | 100 | ###% |
| 12-16-2018 | 200 | ###% |
| 12-16-2018 | 300 | ###% |
| 12-16-2018 | 400 | ###% |

Previous | Page 1 of 1 | Next

- <Cards list
- Add Preset
- Add Card
- Add Text
- Time Period
- Filter
- Dashboard Details

FIG. 10

CALCULATED FIELDS > Edit Ad Ad Comp % Edit Test 2

Select Column Type
All

Search columns

| | |
|---|---|
| T | ACCT_MO_N |
| T | ACCT_MO_WK_N |
| T | ACCT_WK_I |
| T | ACCT_YR_I |
| f₃ | AD_BASE_SLS |
| f₃ | AD_BASE_SLS_Max |
| f₃ | AD_BASE_SLS_Min |
| fx | Ad Ad Comp % |
| fx | Ad Ad Comp % Edit Test 2 |
| fx | Ad Ad Comp Pct |
| fx | Ad Comp Test Case |
| fx | CF 1 |

← 1002

Select Function Type
All

Search function items

| |
|---|
| Equals |
| Interval |
| Not Equals |
| regex |
| like |
| Addition |
| Subtraction |
| Multiplication |
| Division |
| Sum |
| Count |
| Doublesum |

← 1004

Enter Calculated Field Name*
Ad Ad Comp % Edit

Enter Description
Re-Test Ad Ad Comp Edit

Enter or paste formula*
sum(MAT_SLS) / sum(AD_BASE_SLS) -1

CLEAR FORMULA   VALIDATE FORMULA

PERMISSIONS
(John Smith ⊗) (Jane Smith ⊗) (Adam White ⊗) (Joan Peterson ⊗)
Add Owners Select Privacy levels
○ Confidential   ● Internal

SAVE CALCULATED FIELD   CANCEL

CALCULATED FIELDS > Edit doublesum test new sales WTD

Ad Ad Comp % Edit Test 2 | ∨

Select Column Type
All

Search columns

| | |
|---|---|
| T | ACCT_MO_N |
| T | ACCT_MO_WK_N |
| T | ACCT_WK_I |
| T | ACCT_YR_I |
| f₃ | AD_BASE_SLS |
| f₃ | AD_BASE_SLS_Max |
| f₃ | AD_BASE_SLS_Min |
| fx | Ad Ad Comp % |
| fx | Ad Ad Comp % Edit Test 2 |
| fx | Ad Ad Comp Pct |
| fx | Ad Comp Test Case |
| fx | CF 1 |

All
Function
Condition
Aggregate
Equals
Interval
Not Equals
regex
like

Enter Calculated Field Name*
doublesum test new sales WTD

Enter Description

Enter or paste formula*
doublesum(NET_SLS) where_time interval 'Week to Date'

CLEAR FORMULA    VALIDATE FORMULA

PERMISSIONS
(John Smith ⊗) (Jane Smith ⊗)  Add Owners

Select Privacy levels
○ Confidential   ● Internal

SAVE CALCULATED FIELD    CANCEL 1000
1002
1004
1006

Holiday Guest Summary LifeStage

☆ Holiday Guest Summary LifeStage ⊙ 1906 Views

Description: Summary of Holiday Guests ( Merchandising )

Data Availability: 2016-01-31 to 2018-04-30

[ PRIOR YEAR 2017-01-29 TO 2018-02-03 ]          ○──● Fiscal Calendar

| Divisi<br>Swap Column<br>1402 | pend Per Guest | Trans Per Guest | Basket Size | Units Per Order |
|---|---|---|---|---|
| ADULT BEVERAGES | $####.## | #.## | $####.## | #.## |
| BAKERY | $####.## | #.## | $####.## | #.## |
| HSHLD/PAPR | $####.## | #.## | $####.## | #.## |
| YOUNG CONTEMPORARY | $####.## | #.## | $####.## | #.## |
| UNKNOWN | $####.## | #.## | $####.## | #.## |
| UNIDENTIFIED | $####.## | #.## | $####.## | #.## |
| TOYS | $####.## | #.## | $####.## | #.## |
| SYSTEMS SERVICES | $####.## | #.## | $####.## | #.## |
| SWIM | $####.## | #.## | $####.## | #.## |
| STORAGE/UTILITY | $####.## | #.## | $####.## | #.## |
| Total | $####.## | #.## | $####.## | #.## |

Swap ( division ) With       1404

- Family Life Stage
- Current RFV
- Household Income
- Generation
- Ethnicity (Self Reported)
- Guest Primary Market
- Division
- Fiscal Week

APPLY    CANCEL

Previous        Page 1        100 rows

DATA VISUALIZATION TOOL WITH GUIDED VISUALIZATION CREATION AND SECURE PUBLICATION FEATURES, AND GRAPHICAL USER INTERFACE THEREOF

CROSS-REFERENCE TO RELATED APPLICATIONS

The present application claims priority as a continuation-in-part application from U.S. patent application Ser. No. 16/746,560, filed on Jan. 17, 2020, the disclosure of which is hereby incorporated by reference in its entirety.

BACKGROUND

Today's data visualization tools (typically, used for displaying business analytics dashboards, and the like) are designed to allow users to create data visualizations that allow users to better understand a data set. Such data visualizations often require aggregation of large amounts of data, often from many different data sources. In many instances, a single user or user group will create a data visualization that may be consumed, or viewed, by a larger user group.

In such an environment, users who create complex data visualizations are often required to have a significant amount of knowledge about the underlying data set on which the visualization is based, as well as some knowledge of a querying language used to access that data. Additionally, users or groups wishing to view data visualizations must be notified by the creating user when such visualizations become available for use.

Existing visualization tools allow users to create data visualizations, such as dashboards, from a series of calculations or analyses. Those calculations or analyses are often created first in a separate visualization space, and the dashboard published to a larger user group reflects an amalgamation of those underlying calculations or analyses. This requires the user creating the visualization to create piece parts of the visualization first, in separate workspaces, and integrate those workspaces into the visualization. This requires significant time and effort for the user. Still further, the user may need significant knowledge of an underlying query language (e.g., SQL) to accurately define portions of the visualization. Such underlying query languages that are known to those users often have limitations in terms of efficiency or effectiveness when large numbers of data records are involved or many data sources are involved. Furthermore, once a data visualization is created, the creating user must somehow notify other users who may wish to view the visualization.

For these and other reasons, improvements in data visualization tools are desired.

SUMMARY

In general, a data visualization tool is described. The data visualization tool may include, for example, guided visualization creation features as well as secure are publication features which allow for automated publication of a visualization to users having differing roles or access rights.

In a first aspect, a method includes displaying a user interface including a canvas and a card builder toolset, the card builder toolset including a plurality of selectable options, each of the plurality of selectable options responsive to user input to present a definition screen including one or more card definition parameter input fields. The method further includes receiving user input into the one or more card definition parameter input fields for each of the plurality of selectable options and, in response, defining at least one aspect of a card to be included within a user dashboard presented on the canvas. The method also includes rendering a card within the canvas in accordance with parameters defined by the user input, the card being included within a dashboard to be displayed to users.

In a second aspect, a method of displaying a dashboard to a plurality of different users is provided. The method includes receiving a definition of a data visualization within a dashboard, the dashboard including one or more cards, the one or more cards presenting a data visualization within the dashboard and having a security option associated therewith, and displaying a first visual representation of the dashboard to a first user. The method further includes displaying a second visual representation of the dashboard to a second user, the second visual representation being different from the first visual representation based at least in part on the security option associated with at least one of the one or more cards.

In a third aspect, a computer-implemented data visualization system is disclosed. The system includes a computing system including a processor operatively connected to a memory storing instructions comprising a data visualization application. When the instructions are executed, the cause the system to: generate a user interface including a canvas and a card builder toolset, the card builder toolset including a plurality of selectable options, each of the plurality of selectable options responsive to user input to present a definition screen including one or more card definition parameter input fields; receive user input into the one or more card definition parameter input fields for each of the plurality of selectable options and, in response, defining at least one aspect of a card to be included within a user dashboard presented on the canvas; and generate a rendering of a card within the canvas in accordance with parameters defined by the user input, the card being included within a dashboard to be displayed to users.

BRIEF DESCRIPTION OF THE DRAWINGS

FIG. 3 illustrates an example user interface of a data visualization tool according to an example embodiment.

FIG. 6 illustrates an example user interface of a data visualization tool including a card builder region and a canvas, according to an example embodiment.

FIG. 7 illustrates an enlarged portion of the user interface of FIG. 6.

FIG. 10 illustrates an example user interface of a data visualization tool in which calculated fields may be defined, according to an example embodiment.

FIG. 11 illustrates a variant of the user interface of FIG. 10 based on selection of a filter applied to the possible calculations that can be performed.

FIG. 12 illustrates an example user interface of a data visualization tool in which filters may be added to a dashboard, according to an example embodiment.

FIG. 14 illustrates an example column swap operation within a user interface of a data visualization tool, according to an example embodiment.

DETAILED DESCRIPTION

As briefly described above, embodiments of the present invention are directed to a data visualization tool. The data visualization tool may include, for example, guided visualization creation features as well as secure publication features which allow for automated publication of a visualization to users having differing roles or access rights. This has the function of simplifying creation of data visualizations, and can also allow users to automatically be presented with a data visualization according to that user's respective access rights.

In example embodiments, data visualizations within the present disclosure are generally constructed as dashboards that may be viewed by a plurality of users. The dashboards may include charts, tables, or other information that may quickly illustrate data to a user. Such dashboards may also be constructed from cards, each of which may include separate analyses of different data sets.

In accordance with the present disclosure, such a data visualization tool may be described in conjunction with business analytics that are presented to a user within a card or dashboard. The business analytics may be focused, in the examples described herein, on use within a retail organization. However, it is recognized that the applicability of such a data visualization tool is not so limited.

The term "user" in the present disclosure may relate to a user of the data visualization tool who acts as an editor of data visualizations. Such a user may have access rights to certain ones of the user interfaces described herein. Other users may act as consumers of the data visualizations that are created. Such users may be referred to as "viewing users" or "customer users" and may have fewer access or editing rights to a particular data visualization as compared to the editing user.

Figure 1:
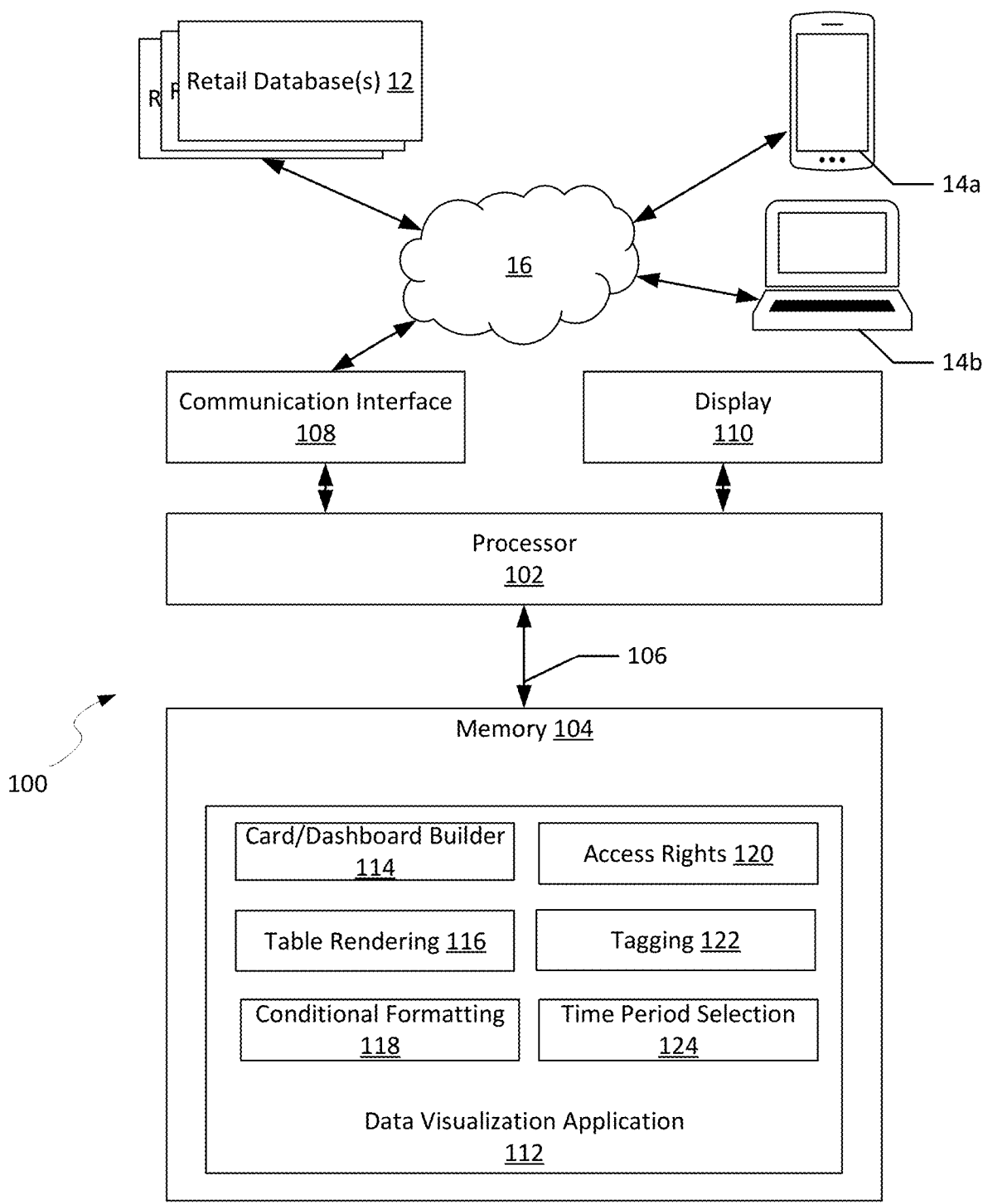
FIG. 1 illustrates an example environment in which a data visualization tool may be implemented.

Referring first to FIG. 1, an example environment 10 is illustrated in which a data visualization tool may be implemented. In the environment 10, a computing system 100 is communicatively connected to a plurality of retail databases 12, as well as other user devices 14 (shown as user devices 14a-b for different users, respectively). The retail databases 12, user devices 14, and computing system 100 may be communicatively connected via a network 16, such as the Internet.

In the embodiment shown, the computing system 100 includes a processor 102 communicatively connected to a memory 104 via an interface 106. The processor 102 is further connected to a communication interface 108 and a display 110. The communication interface 108 allows the computing system 100 to communicate with other devices via network 16.

In the embodiment shown, the memory 104 stores a data visualization tool 112. The data visualization tool 112 includes a card/dashboard builder 114, a table rendering component 116, a conditional formatting component 118, an access rights component 120, a tagging component 122, and a time period selection component 124. Other components may be included in the data visualization tool 112 as well, in various embodiments.

The card/dashboard builder 114 provides a plurality of selectable options to a user, for example in a builder menu, which may be selected to display additional screens with which a user may define parameters that are used to define a card that will be included in a data visualization. In example embodiments, and as discussed further below, the card/dashboard builder 114 provides a guided card building process in which a graphical user interface presents an untrained user a canvas and a guided set of options, with a set of selected decisions used for defining a card, including creation/modification of a card, defining a card dataset, defining a chart type for inclusion in the card, a time period for relevant data, sorting/filtering criteria, as well as a definition of additional card details and data access rights. The card may be built directly on a canvas to form a dashboard, rather than requiring cards to be built in a separate tab and referenced by a dashboard that is published to a user.

The table rendering component 116 can render data tables within a card or dashboard to present data to a user in a variety of ways. In some embodiments, the table rendering component 116 can cooperatively operate with the conditional formatting component 118 to generate, e.g. data visualizations that may be adjustable in response to user manipulation of graphical elements within the card or dashboard. For example, as noted below, in some embodiments, a user may be able to create a calculated field, which renders, within the data visualization tool, a visualization of a combination of existing data fields within a card without affecting underlying data sets (e.g., by performing a join or other operation on those data sets). For example, data fields that are combined in a particular analysis or visualization may be combined without first requiring that data to be staged in an intermediate table. Instead, the data is appended together or merged at the time a user selects to modify or merge two fields to form a new calculated field or at the time the card or dashboard is updated. Underlying data sources are not modified, and therefore underlying ETL processes do not need to be performed. Additionally, using the table rendering component 116 and/or conditional formatting component 118, such calculated fields may include injected code (e.g., javascript) that allows a user to add significant additional modifications to a particular set of data or visualization.

As further described below in connection with FIGS. 21-23, portions of the card/dashboard builder 114, the table rendering component 116, and the conditional formatting component 118 can be combined to form part of an exportable data visualization library. As an example, a user interface component generator 2202 and a data visualization library 2200 are illustrated in FIG. 22. The data visualization library 2200 can, for example, be exported to, and integrated into, a third-party application. In the example of FIG. 1, however, the data visualization library is integrated into the computing system 100.

An access rights component 120 allows users to view a dashboard that includes one or more cards. As discussed in further detail below, different users having different access rights may have different views of the dashboard or of one of the cards based on those different access rights. For example one user may lack access to one or more cards included in the dashboard while a second user may have access to all cards in the dashboard. A creator of a card may set access rights for the card, for example to expose the card to users internal to or external to an organization, with different data access levels. Additionally, some users may be designated as editing users, while other users may be designated as consumers of data visualizations who are not given all rights to, e.g., create and/or edit cards and/or dashboards.

The tagging component 122 allows creators of cards to tag those cards with specific topic of words. Additionally, dashboards may be created and tagged with specific topic words. Consumer users may subscribe to a tag to a mentally obtain access to content as that content is created. In this way, the consumer of a dashboard or card need not have previous knowledge of the card or dashboard to have that card or dashboard exposed to them.

The time period selection component 124 allows a user to select from among a plurality of different time periods for analysis. Although in some embodiments, the time period selection component 124 allows a user to select a date range for analysis, in other embodiments the time period selection component 124 also allows the user to toggle between a predetermined time period calculated based on a standard calendar, and a time period that is based on a fiscal year calendar (e.g., starting on a different month or day of the week automatically). Examples of such a calendar toggle are provided below in FIG. 14.

Figure 2:
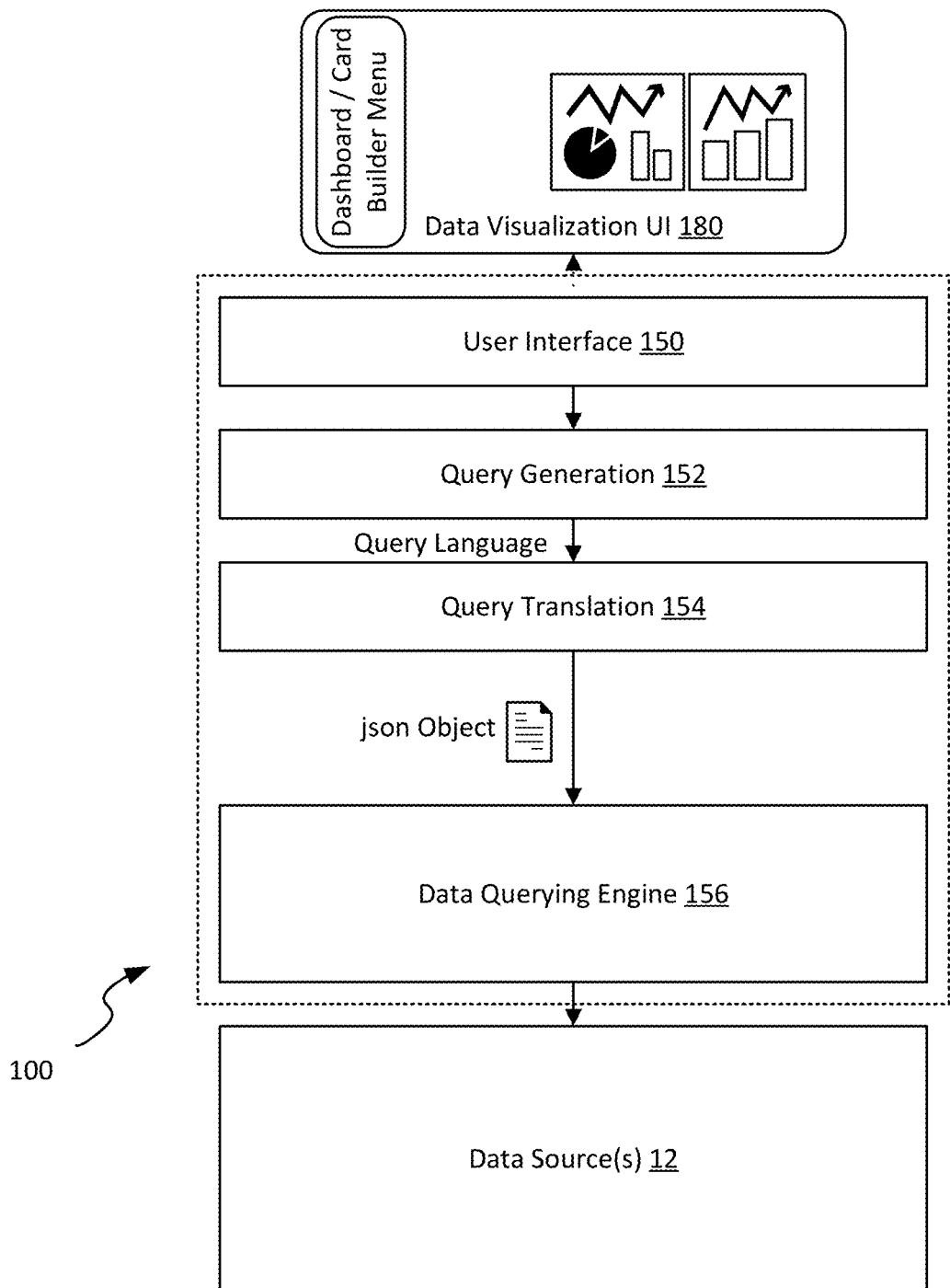
FIG. 2 illustrates an example architecture of a data visualization tool, according to an example embodiment.

FIG. 2 illustrates an example architecture of a data visualization tool, according to an example embodiment. The architecture may be implemented at least in part on a computing system 100 as illustrated in FIG. 1. In the embodiment shown, a computing system 100 is connected to a plurality of data sources 12. The computing system 100 includes a user interface 150, a query generation layer 152, a query translation layer 154, and the data querying engine 156.

The user interface 150 is configured to generate one or more data visualizations in a data visualization user interface 180. The data visualization user interface generally includes a canvas area in which data visualizations may be defined, and a dashboard or card builder menu that guides a user through the process of defining such data visualizations. The user interface 150 generally is hosted for remote viewing by users who either create or view data visualizations.

The query generation layer 152 translates user inputs received in the data visualization user interface 180 into a definition of a data visualization, which may include one or more queries of data sources 12. The query generation layer 152, in some embodiments, translates selection of data sources and data elements within those data sources as queries in a querying language. In some embodiments, the querying language can be a customized language similar to a structured query language (SQL).

The query translation layer 154 receives the query defined in the query language, and translates that query into a package capable of ingestion by the data querying engine 156. In example embodiments, the query translation layer 154 translates the query language into a JSON object that is consumable by the data query engine 156.

In example embodiments, the data query engine 156 can be, for example, implemented using the Druid open source distributed data store and ingestion platform. Use of Druid has the advantage of managing very large quantities of data in queries, with low latency. However, Druid is sometimes not used because it requires formatting of queries submitted to that software as JSON objects. Because traditional data visualizations are generated using structured queries which are significantly more readable to a user than JSON objects, it can sometimes be difficult to implement data visualization solutions via such a data query engine 156. However, through the use of a customized query language implemented by the query generation layer 152, as well as a query translation layer 154 that accurately translates those custom queries into appropriately formatted objects, the high quantity, low latency querying advantages of Druid may be realized in the data visualization tool described herein.

FIG. 3 illustrates an example user interface 300 of a data visualization tool according to an example embodiment. The user interface 300 represents an interface that may be presented to a user who either wishes to create cards or dashboards or has subscribed to cards or dashboards for viewing.

In the example shown, the user interface 300 includes a collection of cards in a cards section 302 and a collection of dashboards illustrated in a dashboards section 304. The cards may be presented in either a whole or partial form, while the dashboards may be presented in a summary format. Upon selection of a card or dashboard, the user may be presented with a user interface in which the user may be able to view the entire card or dashboard, or edit the card or dashboard.

In the sample embodiments, a user may set one or more favorites or subscribe to one or more topics as "tags". In such instances, if new cards or dashboards are made available by other users that have a shared topical tag those cards or dashboards may appear in the summary format in the user interface 300.

Figure 4:
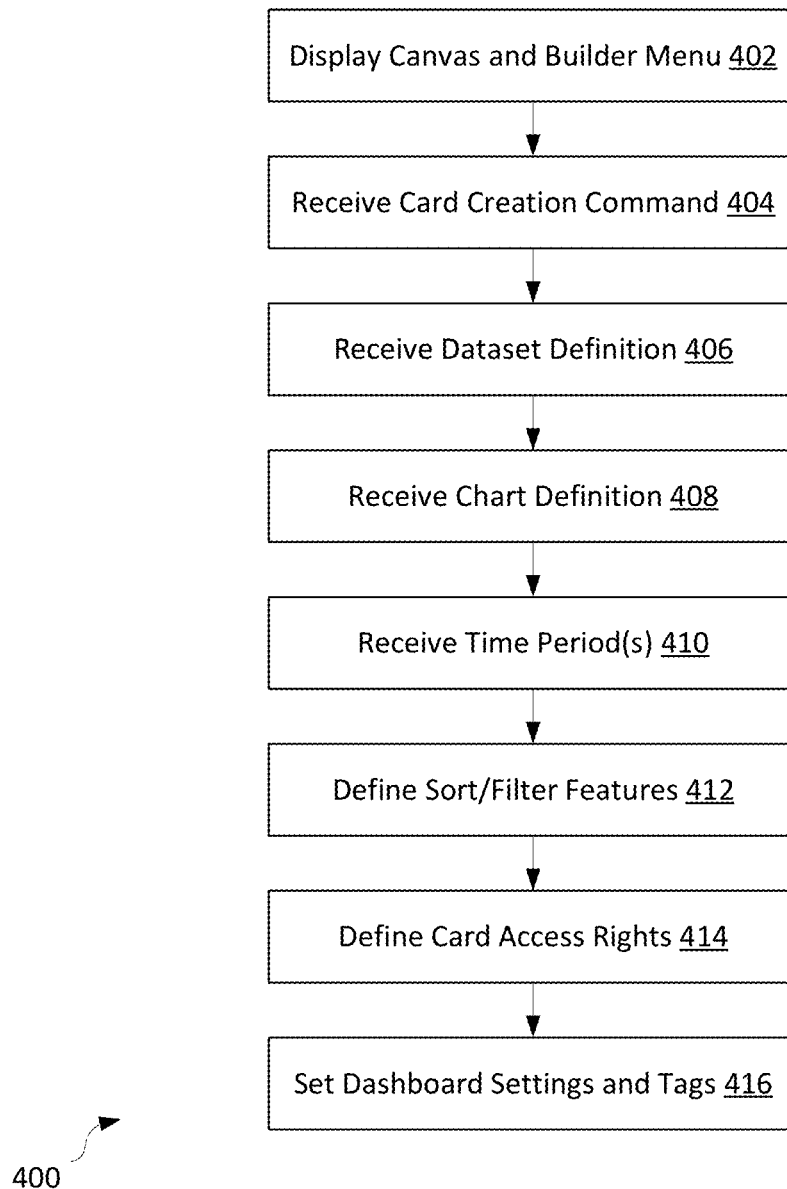
FIG. 4 illustrates an example method of using a card builder tool set within a data visualization tool to create a data visualization, in accordance with an example embodiment.
Figure 6:
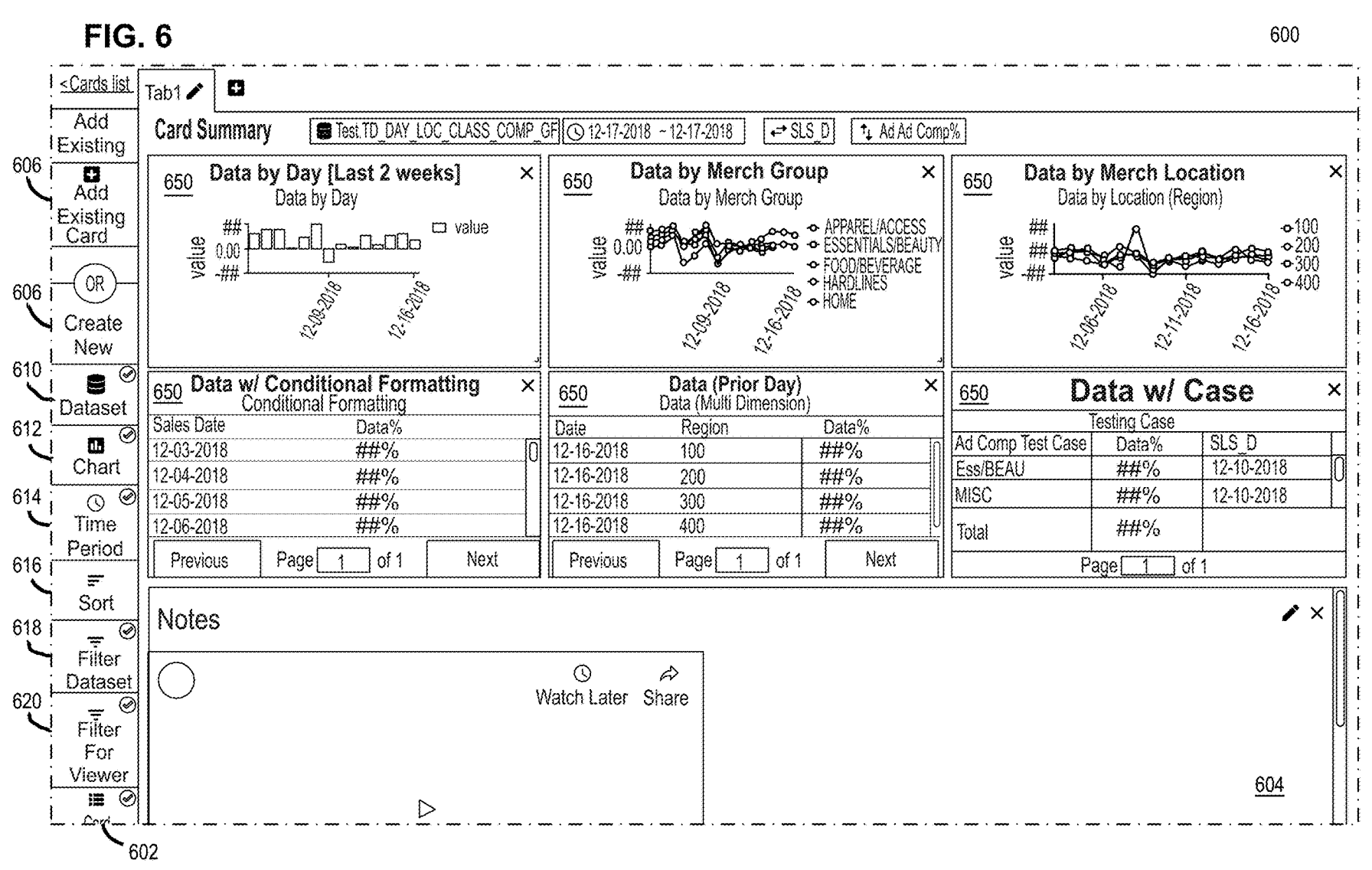

FIG. 4 illustrates an example method 400 of using a card builder tool set within a data visualization tool to create a data visualization, in accordance with an example embodiment. The card builder tool set may be presented to the user within a user interface generated by a data visualization tool, for example as seen in FIGS. 6-7.

In the embodiment shown, the method 400 includes displaying a user interface including a canvas and a builder menu (step 402). The method includes receiving a card creation command (step 404). Once a card creation command has been received, the all the data visualization tool may also receive a definition of a data set to be used in the card or dashboard (step 406). The data visualization tool may further receive a definition of a chart style (step 408), which represents the type of visualization that the user wishes to view for the selected data set.

In example embodiments, the data visualization tool may receive a definition of one or more time periods upon which to perform analysis (step 410). This can include, for example, defining a start date and end date for the analysis, or selecting a predefined sliding window (e.g., last week, last month, last quarter). In still further implements, this can include receiving selection of a predefined last fiscal period (e.g., a last quarter as defined for the particular entity associated with the data visualization tool, or a last week defined to start on a different, specific day of the week for accounting purposes).

In further example embodiments, the data visualization tool may receive definition of one or more sorting or filtering features (step 412). The filtering features can be defined by the user to allow viewers of the card or dashboard to filter data based on the data included in one or more columns within that visualization. An example of such a filter definition is provided below, discussed in conjunction with FIGS. 12-13.

In still further example embodiments, the data visualization tool may receive a definition of card access rights for a given card or dashboard (step 414). For example, the data visualization tool may receive part details including a setting of whether the card is intended for confidential or internal use only. If considered confidential, a card may be accessible to users outside of an organization who have adequate access rights. If considered internal use only, even those users having access rights to confidential information may not have access to information on the card, if those users are not within the organization. Examples of permission settings are provided in the user interface 1000 shown in FIGS. 10-11.

In the example shown, the data visualization tool receives one or more dashboard or card settings, as well as one or more tags (step 416). Such card or dashboard parameters may be defined in the builder menu, for example after selecting a card details selectable region as described below. The tags may be defined as one or more keywords associated with a dashboard or card that may describe the contents of that card. For example, a tag may be defined such as "quarterly sales" or "same store performance". Another user may search for such a tag or may subscribe to such a tag in a user's home page (e.g., in a user interface analogous to FIG. 3) to obtain access to such tagged cards or dashboards automatically once they are published and therefore accessible to the user.

Figure 5:
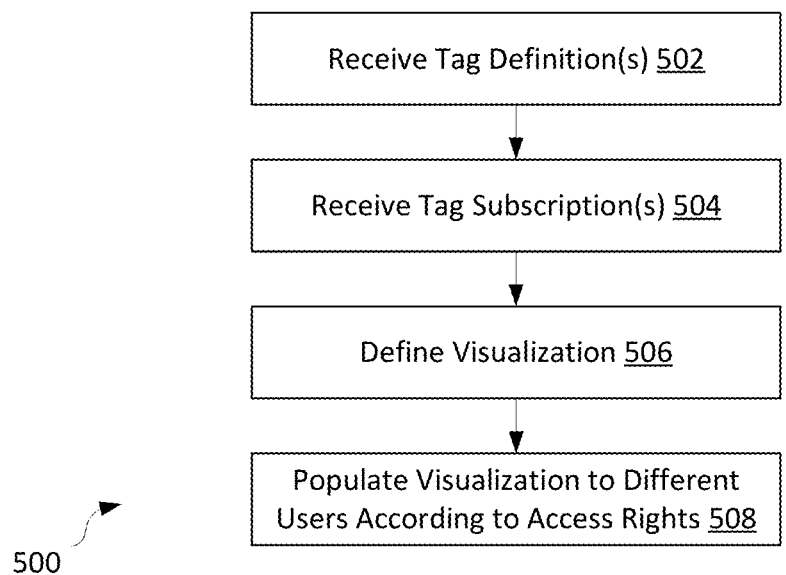
FIG. 5 illustrates an example method of publishing visualizations to different users based on tags, subscriptions, and access rights, according to an example embodiment.

FIG. 5 illustrates an example method 500 of publishing visualizations to different users based on tags, subscriptions, and access rights, according to an example embodiment. The method 500 may be performed, for example, using a data visualization tool as noted above, for distribution of dashboards and/or cards to various users 14a-b.

In the example shown, the method 500 includes receiving tag definitions from a user who is a creator or editor of a card or dashboard (step 502). As noted above, the tag definitions may be any keyword that would likely be searched or desired by users who wish to find the card or dashboard, such as "quarterly sales", "trending sale items", "same store performance", or similar words/phrases. A tag subscription can then be received from two different users. For example, a first user internal to the organization whose data is used to create the data visualization may subscribe to any tags associated with "quarterly sales" and "trending sale items", and a second user who is external to the organization but has at least some access rights to view data visualizations may subscribe to "trending sale items". Once a dashboard or card is fully defined and therefore published for access by other users (step 506), a notification regarding the card is populated to the different users who subscribed to the tag associated with that dashboard or card.

Continuing the above example, the "trending sale items" visualization may be a dashboard that has a plurality of associated cards. Some of those cards may be set to a confidentiality level of "internal only" while other cards may simply be set to a confidentiality level of "confidential". Those "internal only" cards may only be presented within the "trending sale items" visualization to the first user and not to the second user, due to differences in data rights. However, both users would automatically be notified of the existence of the data visualization since both subscribed to data visualizations according to the associated keyword tag.

Referring now to FIGS. 6-20, additional user interfaces are illustrated which highlight certain features of the data visualization tool described herein, and as briefly described above. The user interfaces may be generated by one or more aspects of a data visualization tool, such as the data visualization tool 112 of FIG. 1 (e.g., using card/dashboard builder 114).

FIG. 6 illustrates an example user interface 600 of a data visualization tool including a card builder region 602 and a canvas 604, according to an example embodiment. The card builder region 602 includes a plurality of selectable regions, including an add card region 606, a create new dashboard region 608, a dataset region 610, a chart region 612, a time period region 614, a sort region 616, a dataset filter region 618, a viewer filter region 620, and a card details region (partially shown). Generally, a user wishing to define a card or dashboard within the canvas area 604 (in which six cards are currently shown, as well as a notes region).

In general, defining a card requires a user to select each of the selectable options to define parameters required to create a data visualization within a card. Similar parameters are required for definition of a dashboard as well.

As seen in FIG. 6, and better seen in the portion of the user interface 600 shown in FIG. 7, each of the selectable regions may include an indicator that indicates whether parameters associated with the selectable reaching have been set for a particular card or dashboard. In the example shown, a checkmark may be included in the selectable region to indicate that the selectable region has been selected and parameters associated with that selectable region has been set for the card that is currently selected. In some examples, when a card is not fully defined, indicia may be displayed (e.g., an "x" or other visible mark) indicating that a parameter must be defined that is associated with the selectable region prior to the card or dashboard being able to be completed and rendered.

As shown generally in FIG. 6, use of the card builder region 602 in association with the canvas 604 allows a user to define cards directly on a canvas area that may also store dashboards. This has significant advantages in terms of time and effort required to create cards and dashboards, because a user will not be required to first create intermediate visualizations in a first workspace to import into a dashboard; all work may be performed concurrently.

Figure 8:
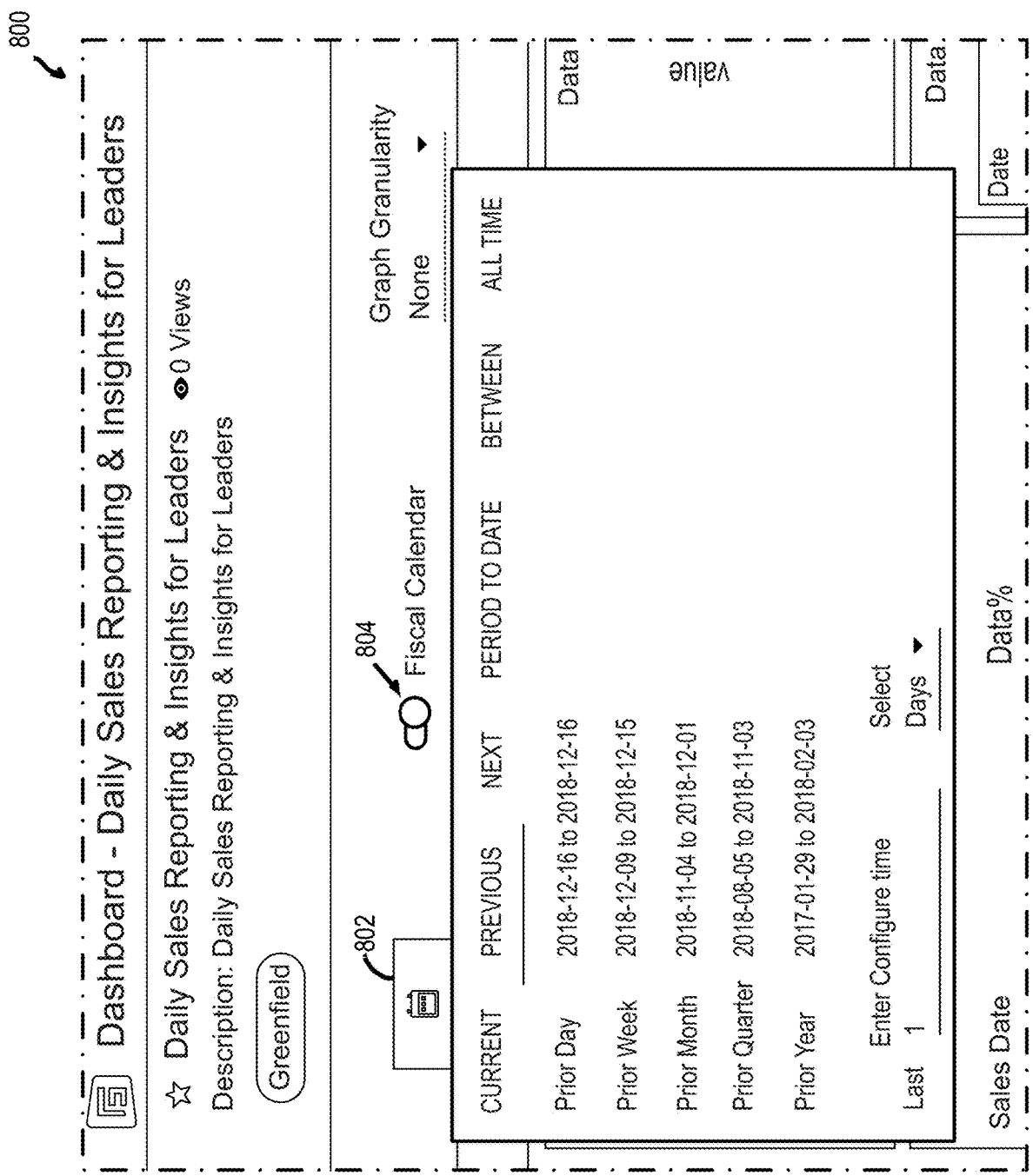
FIG. 8 illustrates an example user interface of a data visualization tool in which a calendar-based time period may be defined for analysis of data within a dashboard, according to an example embodiment.
Figure 9:
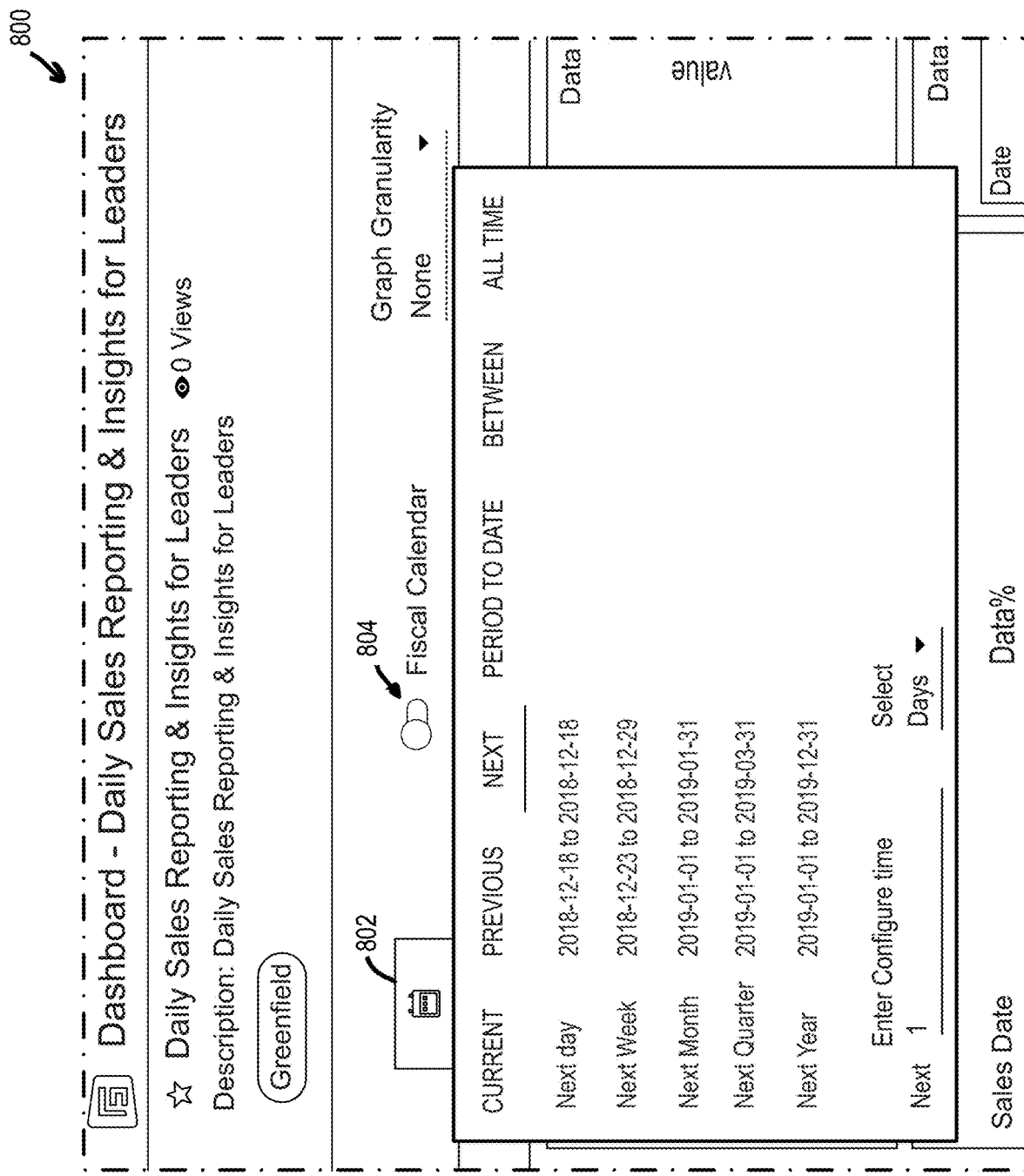
FIG. 9 illustrates an example further version of the user interface of FIG. 8.

FIGS. 8-9 illustrate a user interface 800 of a data visualization tool in which a calendar-based time period may be defined for analysis of data within a dashboard, according to an example embodiment. The user interface 800 represents an example dashboard showing a data visualization of daily sales. In the example shown the dashboard includes a date selector 802 and a calendar selection toggle switch 804. The date selector 802 allows a user to define a date range for analysis, for example a prior day, prior week, prior month, prior quarter, or prior year. In the example shown the calendar selection toggle switch 804 is activated, and therefore the periods of time shown in the date selector represent dates that correspond to a fiscal calendar of the organization. By way of comparison, in FIG. 9, the calendar selection toggle switch 804 remains unselected. In that version of user interface 800, the time periods (in this case, a next time period rather than previous time period) are set based on a traditional calendar, rather than on a fiscal calendar. Accordingly, in certain embodiments described herein, graphical elements may be provided that allow a user to quickly and conveniently swap between organization-relevant time periods and time periods typically used external to the organization.

FIGS. 10-11 illustrate an example user interface 1000 of a data visualization tool in which one or more calculated fields may be defined within a card or dashboard. Calculated fields, in accordance with the present disclosure, can correspond to fields which may be generated based on other fields already included in the card or dashboard or defined as being included in data sources. In the example user interface 1000 as shown, a user may search for and select fields in previously-identified data sources in a field selection region 1002, and define one or more functions to be applied to those fields from a function selection region 1004. As seen in FIG. 10, functions can include, for example, various Boolean and mathematical operations that may be performed on a plurality of data fields that are included in the card or dashboard. A calculated field definition sub-window 1006 allows the user to name the calculated field and manually edit a calculation to be performed across data fields. Additionally, permissions may be granted to the calculated field and to the card overall, as noted above (e.g., to define owners of a card who are allowed to edit the card or dashboard, as well as a privacy level which defines whether only internal users may view the card or dashboard or whether authorized external users may also have viewing rights).

As seen in FIG. 11, a selection window 1102 allows a user to select a specific type of calculated field to filter among the calculations that may be performed. In the example shown, a variety of function, condition, and aggregate calculations are illustrated as being available to be performed on particular data sources; in alternative embodiments, other types or categorizations of data fields may be provided as well.

In example embodiments, the available types of calculated fields can be implemented as code embedded within a particular card or dashboard that allow certain fields to be formed at the time the card is displayed. The code may embed calculations into the definition of the card or dashboard such that, at the time of display of the card or dashboard, each of the underlying data sources can be accessed and, embedded within the card, various data manipulations may be performed prior to display of data. For example, embedded code (e.g., javascript) may be used to, e.g., join data fields by calculating a sum or other mathematical derivation of the underlying data fields, without requiring a join between two heterogeneous data sources to be performed prior to that calculation, and without making that calculation apparent/visible to a non-editing user of the card or dashboard. In example embodiments, such embedded code may automatically be added to the card or dashboard based on graphical user manipulations of data, e.g., to combine particular data fields to display predefined calculations from user-definable data sources.

Figure 12:
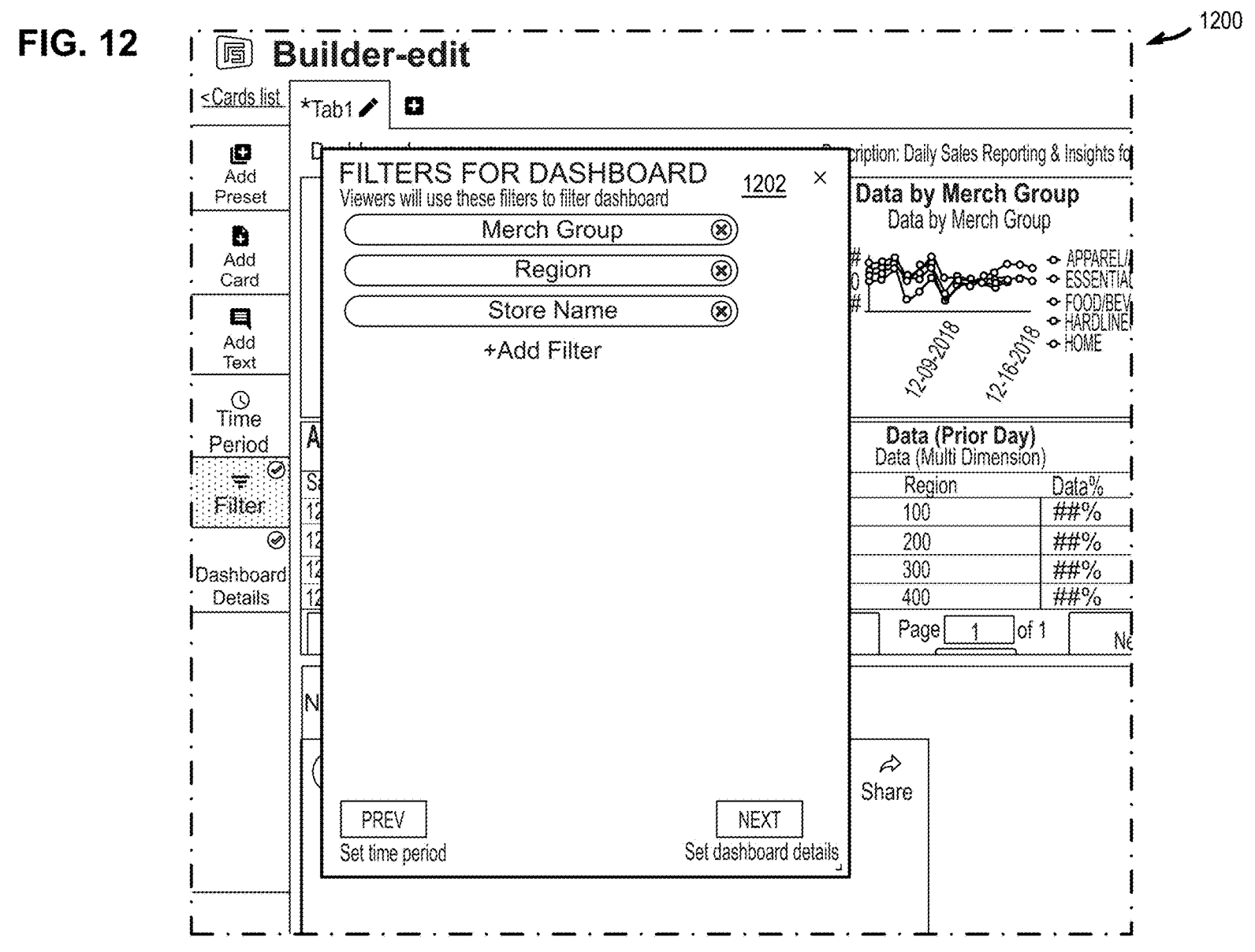
Figure 13:
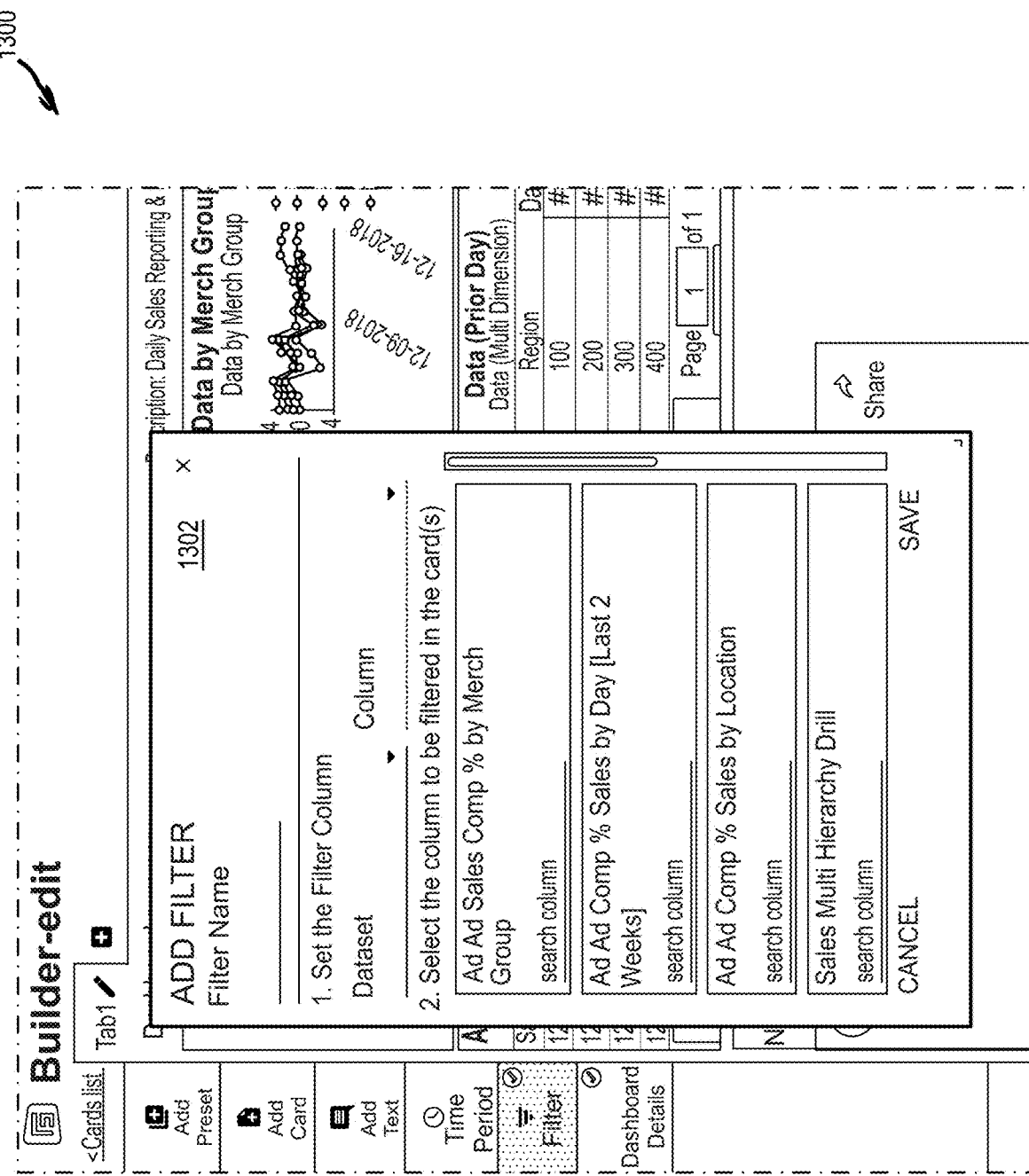
FIG. 13 illustrates a further example user interface of a data visualization tool in which filters may be added to a dashboard, according to an example embodiment.

As illustrated in FIGS. 12-13, a further example user interface 1200 is shown which may be displayed upon selection of a filter option (e.g., viewer filter region 620) of a builder region 602, in the user interface 600 of FIG. 6. In the example shown, the user interface 1200 allows a user to define one or more data filters that can be applied to data within a dashboard that is created or edited by the user, via a filter definition tool 1202. As seen in FIG. 13, a further user interface 1300 can be displayed upon selecting to add a filter within the user interface 1200. The user interface 1300 presents a further filter addition screen 1302 that allows a user to name a filter, and define a dataset and column to be filtered based on the selected filter. The filter may then be saved for use by other users who may elect to view the card or dashboard.

FIG. 14 illustrates an example column swap operation within a user interface 1400 of a data visualization tool, according to an example embodiment. In the example shown, the user interface 1400 depicts a dashboard having a plurality of data columns. A user may select a swap column option 1402 that can be activated by selecting a column, which leads to display of a swap screen 1404. The swap screen 1404 allows a user to swap the selected column with another dimension for analysis. In the example shown, a column "division" can be swapped with various other dimensions to provide analysis along that other dimension such as, e.g., household income, ethnicity, primary market, fiscal week, family life stage, etc.

In example embodiments, the column swap can be performed, as with the calculated fields and the filters, without reconfiguration of underlying databases 12, or performing additional ETL operations to modify underlying data.

Referring to FIGS. 15-19, various additional user interfaces are illustrated that are useable by various users to define, navigate, and view drill-through visualizations using the data visualization tool described herein. In particular, the user interfaces disclosed herein allow an editing user to define drill-through visualizations quickly on large-scale data using a card-based interface, while also allowing an end user (e.g., a consumer of the analysis) to easily view up-to-date records across vast datasets in various ways. Accordingly, the tools described herein enable a display of a drill-through tool useable to define an interrelationship among a plurality of cards as an ordered sequence. Each of the cards may display a different graphical depiction of data at a different level of detail.

Figure 15:
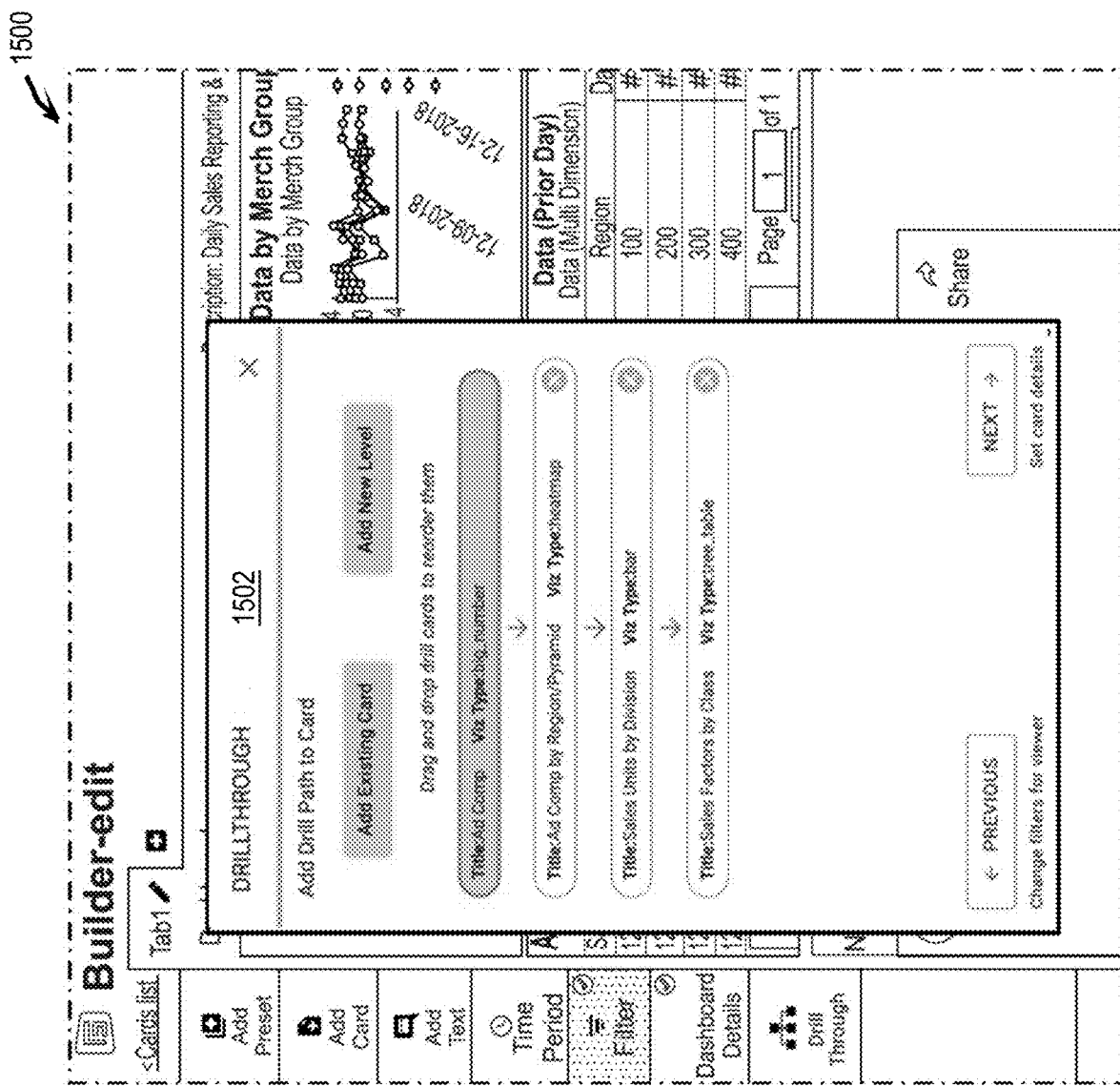
FIG. 15 illustrates an example user interface of a data visualization tool in which a drill-through operation can be defined, according to an example embodiment.

FIG. 15 illustrates an example user interface 1500 of a data visualization tool in which a drill through tool 1502 is shown. In the drill-through tool 1502, drill-through operation can be defined, according to an example embodiment. In general, a drill-through operation refers to a circumstance in which a user selects a particular data visualization or dataset, and rather than a drill-down, which leads to an underlying subdivision or sub-categorization (breakdown) of that visualization or dataset, other, predefined and related data may be provided to that user. For example, a report illustrating sales by region may be selected to show a related, relevant report such as a pictorial of a geographic region illustrating a heatmap of sales, or an analysis grid that is arranged based on some alternative breakdown (e.g., by type of item sold, or along some other metric). It is recognized that similar types of graphics could be used.

Specifically in the example shown, upon selection of the drill-through tool 1502, a user interface 1500 is shown in which a user may be allowed to define a drill path for a particular card. Specifically, as shown the user may be allowed to either add an existing card (i.e., to add a new type of visualization to a drill path from an existing card), or add a new level to the current drill through sequence (e.g., adding a new card to the overall drill sequence). In the example shown, an editing user may elect to change filters that are used in each of the cards associated with the drill path, or otherwise can set card details for a currently selected card. In the example shown, the user interface 1500 displays a card sequence that may be manually reordered, for example by a drag and drop process.

In the particular example shown, a top level card "Ad Comp" allows a user to select the visualization to drill through to an "Ad Comp by Region" visualization. The "Ad Comp by Region" visualization permits drill through to a "Sales Units by Division" visualization, which may subsequently be drilled through to a "Sales Factors by Class" visualization. If each of these visualizations may have different visualization types, such as a heat map, bar, or tree table. An example drill through visualization sequence based on the defined sequence using the tool depicted in the user interface 1500 is seen in FIGS. 17-20, below.

Figure 16:
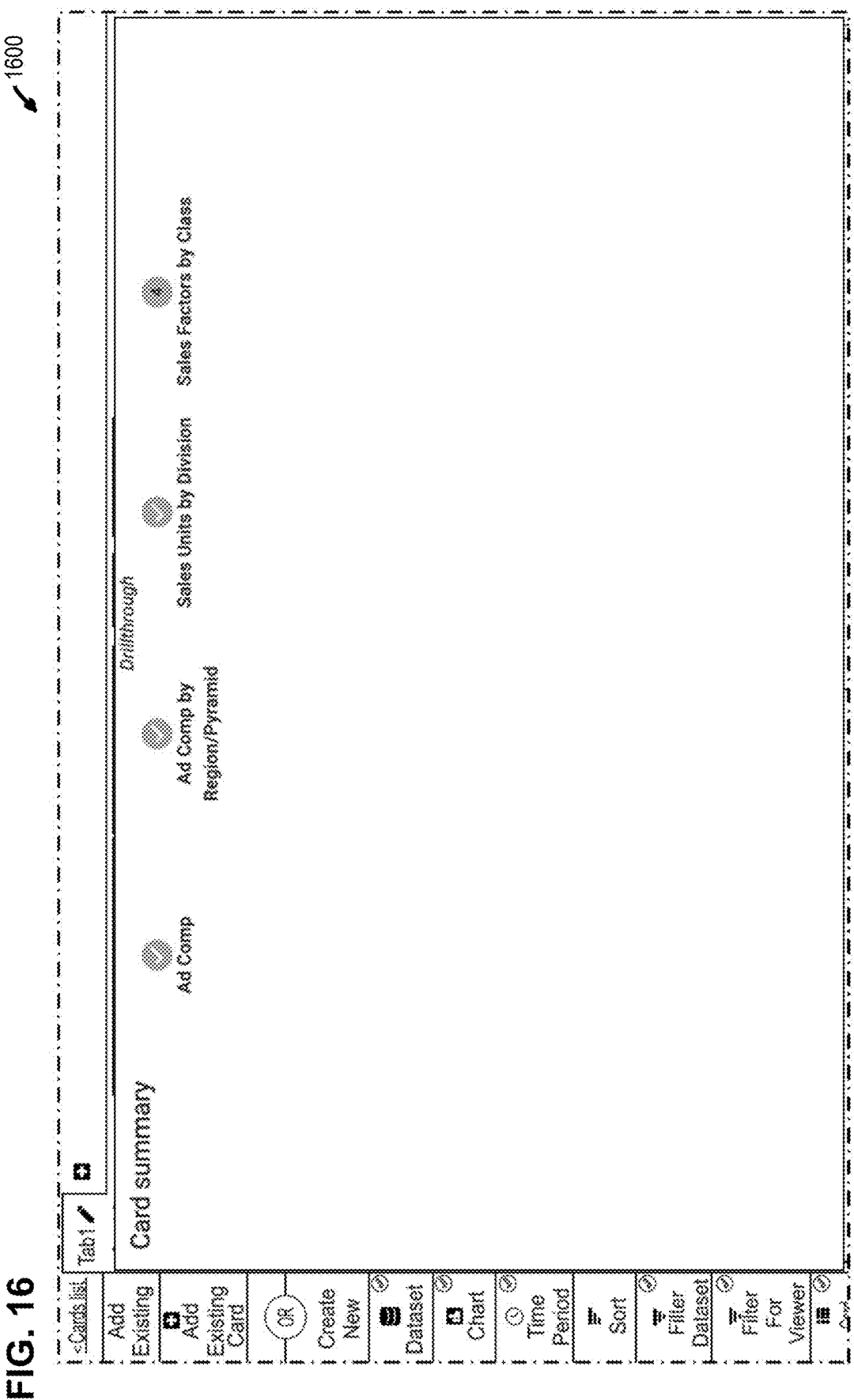
FIG. 16 illustrates an example user interface of a data visualization tool in which defined levels of a drill-through operation can be viewed and navigated during editing, according to an example embodiment.

FIG. 16 illustrates an example user interface 1600 of a data visualization tool in which defined levels of a drill-through operation can be viewed and navigated during editing, according to an example embodiment. In the example shown, the user interface 1600 allows a user to select a particular card, and in particular a card summary card. In this example, each of the defined cards that are including a drill through sequence are listed, and the cards may be selected for patenting from the card a summary. By selection of one of the cards, the user may perform further editing operations on that card, for example to change an appearance or dataset associated with the card.

Figure 17:
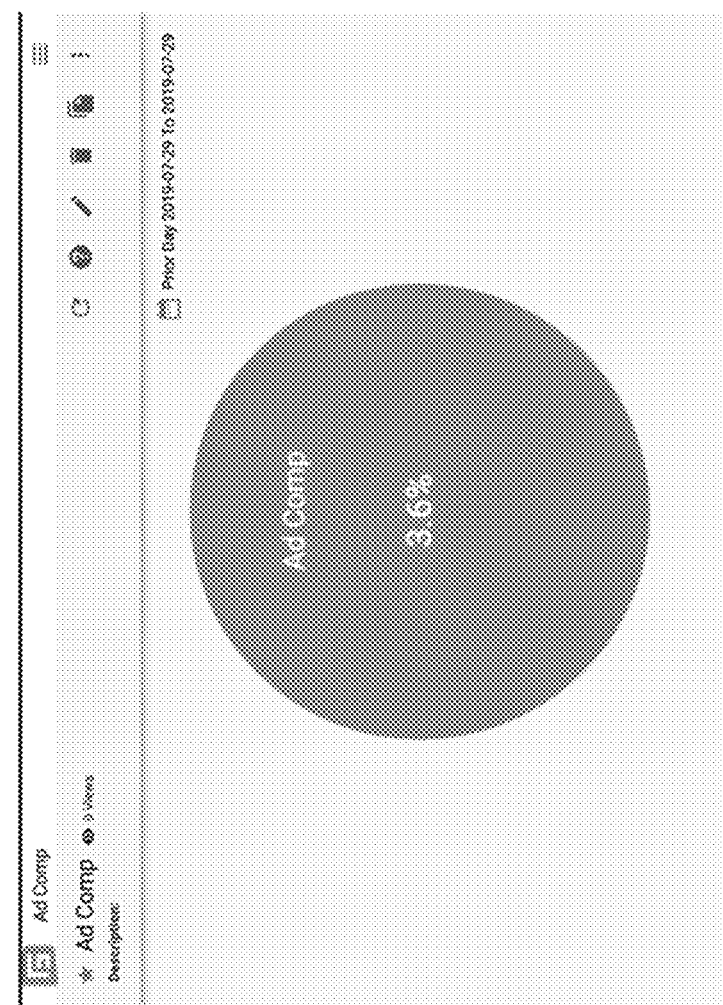
FIG. 17 illustrates an example user interface of a data visualization tool in which a user may conduct a predefined drill-through operation, according to an example embodiment.

Referring now to FIGS. 17-20, a sequence of user interfaces is shown that displays an example drill through sequence that may be defined, for example using the user interfaces of FIGS. 15-16. FIG. 17 illustrates an example user interface 1700 of a data visualization tool in which a user may conduct a predefined drill-through operation. In this example, an "Ad Comp" top level data set is displayed within a card. Upon user selection of the graphic within the user interface 1700 (e.g., by double clicking or otherwise selecting the graphic), a further user interface 1800 seen in FIG. 18 may be displayed. As seen in that Figure, while the top level data visualization showed only a single statistic, the first drill down illustrates the same general topic, but within a different type of visualization and broken down along particular characteristics (e.g., by region and item type).

Figure 18:
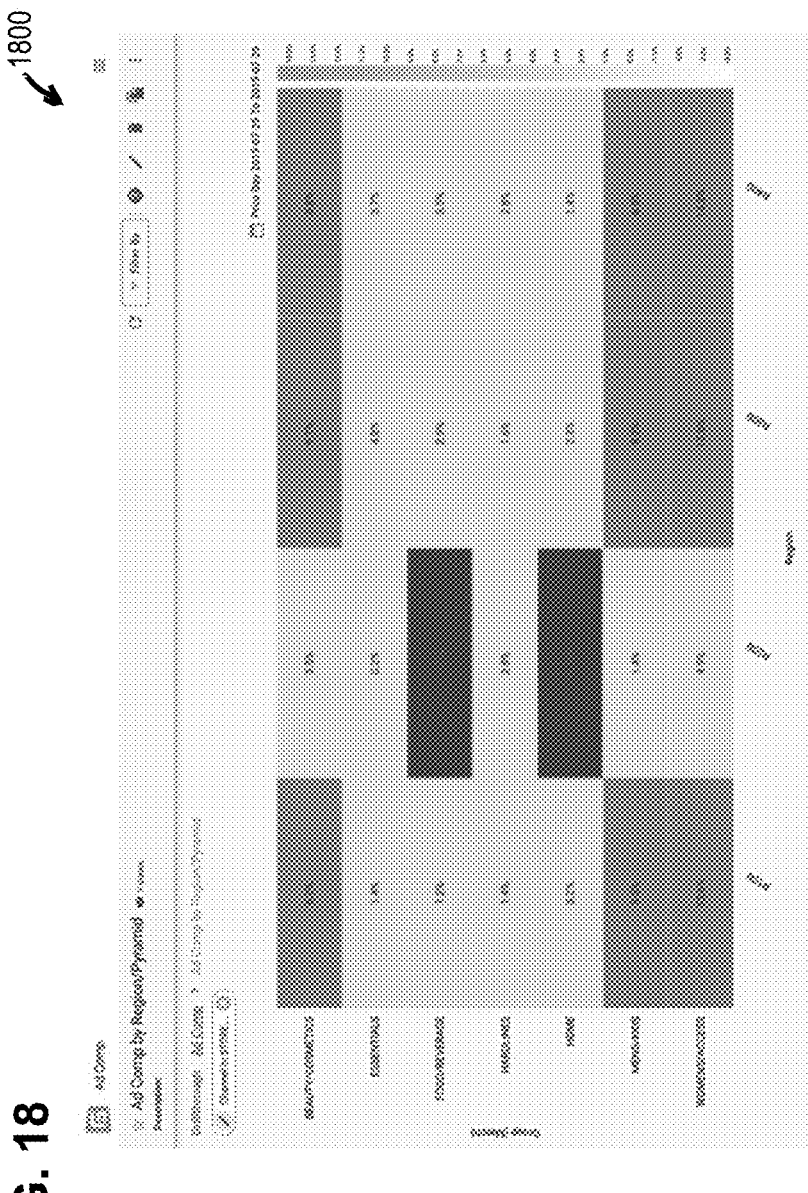
FIG. 18 illustrates a further example user interface showing a drill through operation from the user interface of FIG. 17.
Figure 19:
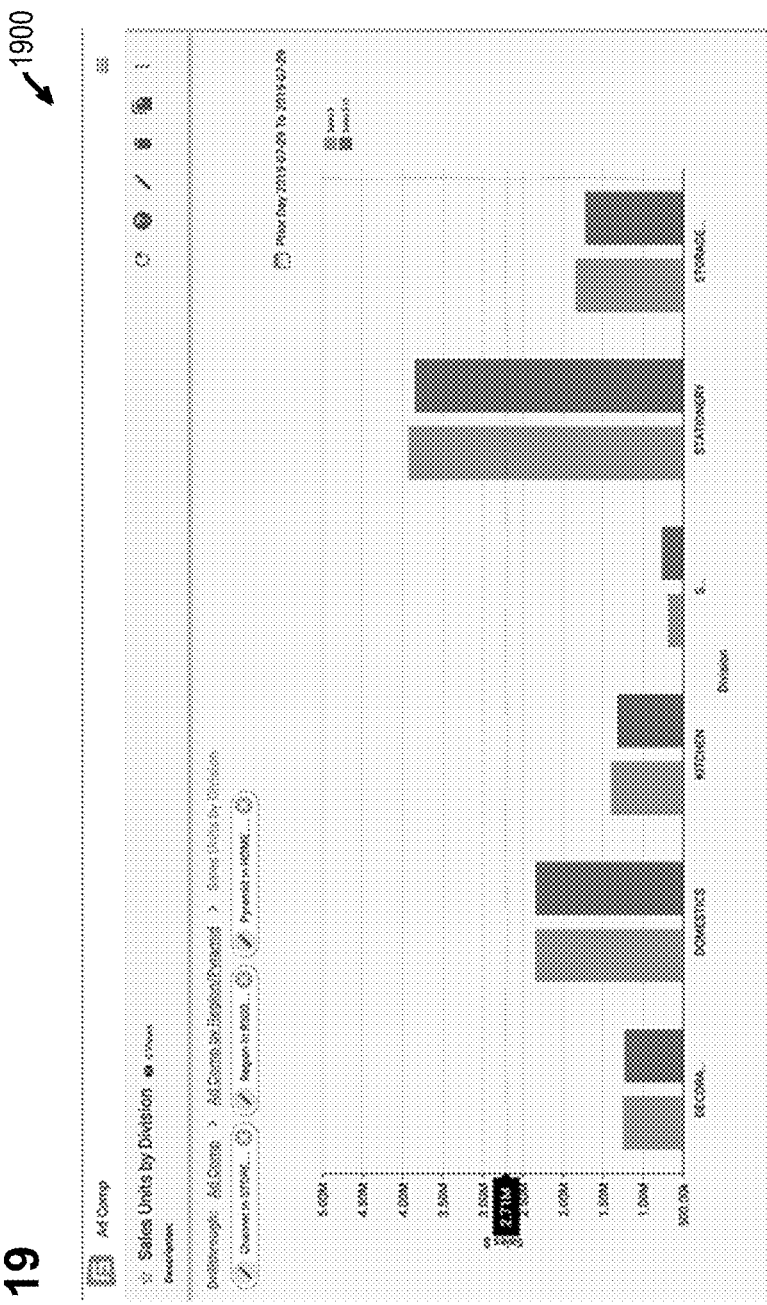
FIG. 19 illustrates a further example user interface showing a drill through operation from the user interface of FIGS. 17-18.
Figure 20:
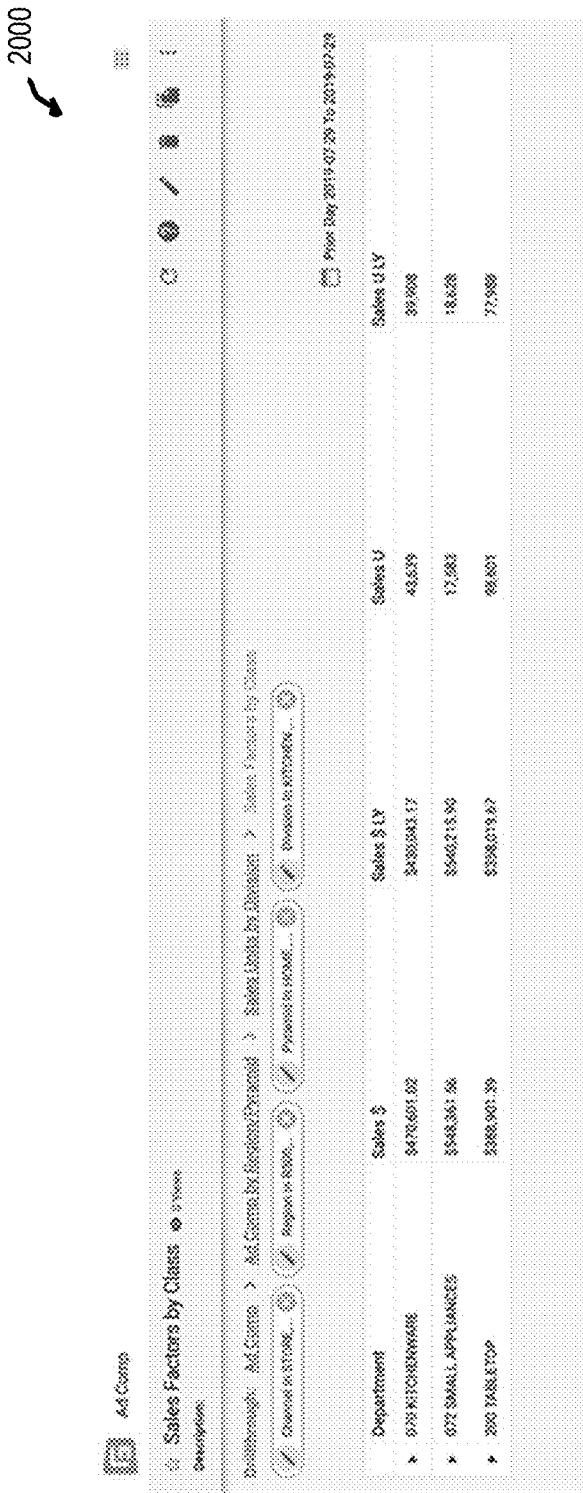
FIG. 20 illustrates a further example user interface showing a drill through operation from the user interface of FIGS. 17-19.

Still further, in FIG. 19, a further drill-through operation results in display of a user interface 1900 in which sales units by division are displayed after a particular region was selected in the user interface 1800 of FIG. 18. In this example, a bar chart is illustrated, after selection of a particular region on a heat map of FIG. 18. Furthermore, a user interface 2000 seen in FIG. 20 can display raw data for a selected division which may be selected from the user interface 1900 of FIG. 19.

Accordingly, referring to FIGS. 15-20 overall, it is seen that in accordance with the present disclosure, the card builder features of the data visualization tool described herein are useable not only to easily define cards in place, but to add drill through features linking cards together, either by newly-creating a visualization in a new card, or by linking to an existing card to establish a relationship therebetween. By way of these drillthrough visualizations, an editing user may easily define navigation paths among the cards that they or others create, to ensure other users (e.g., non-editor, consumer users) have the ability to view data of interest.

In an example embodiment, as briefly described above and as further described in connection with FIGS. 21-23, portions of components of the data visualization tool 112 can be exported, as a data visualization library, for use in a third-party application and for use with a third-party database. The exportable data visualization library can, for example, perform the functions of the data visualization tool 112 that relate to creating and rendering visualizations of data. However, because the data visualization library does not include all components of the data visualization tool 112, the data visualization library does not, in some embodiments, perform all the functions, as described above, of the data visualization tool 112. Nevertheless, it is recognized that an exportable data visualization library has advantages. For example, the data visualization library can be used in applications that do not require the full functionality of the data visualization tool 112, the data visualization library can require less computational resources and time than the data visualization tool 112, and the data visualization library can be easier to use than the data visualization tool 112. Furthermore, it can be advantageous for an organization to export only parts of the data visualization tool 112, in the case, for example, where an importing system only requires parts of the data visualization tool 112, or an exporting organization only wants to make parts of the data visualization tool 112 available.

Figure 21:
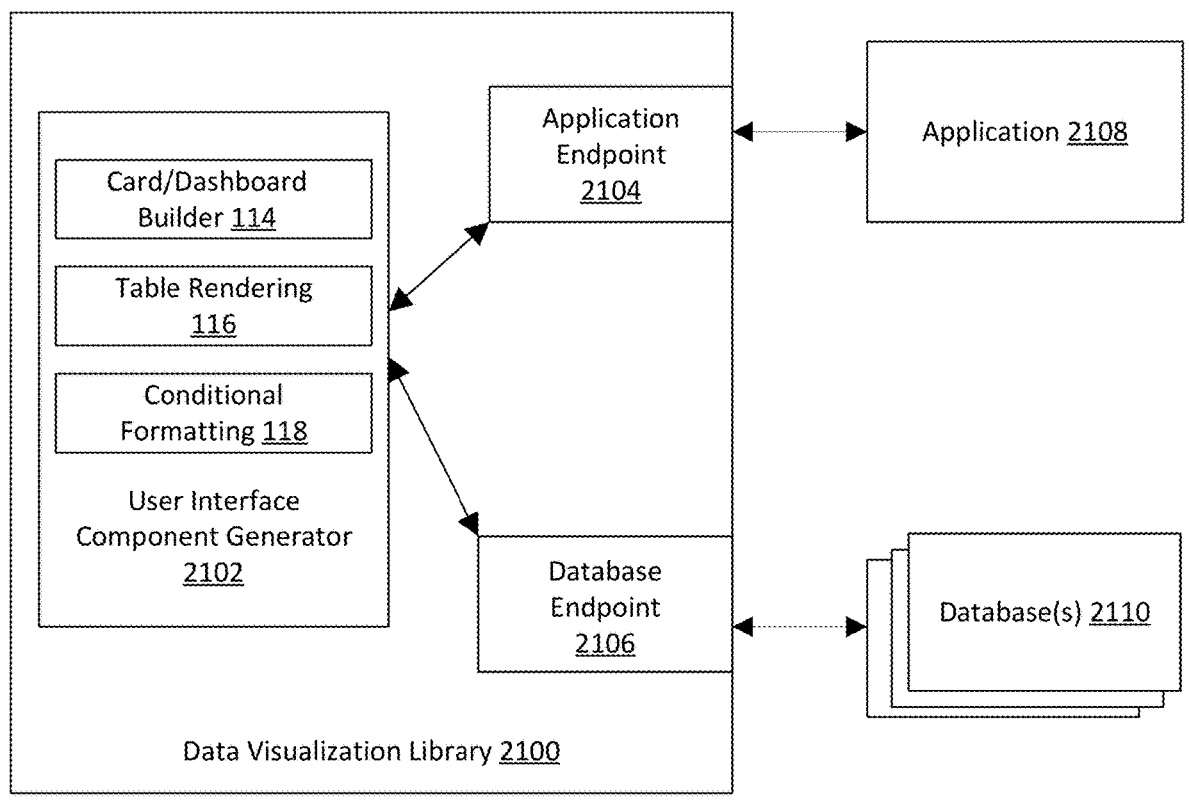
FIG. 21 illustrates an example architecture of a data visualization library, according to an example embodiment.
Figure 22:
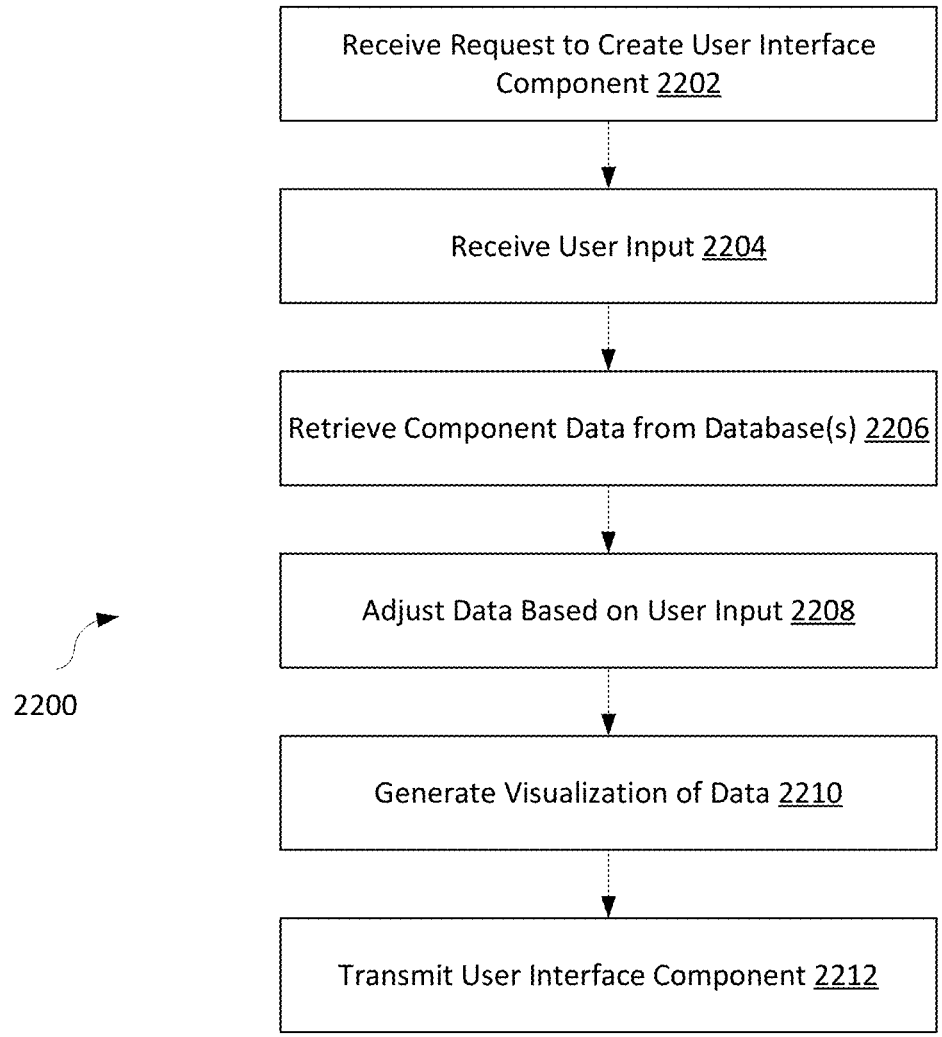
FIG. 22 illustrates an example method of using a data visualization library to create a user interface component, in accordance with an example embodiment.

Referring now to FIG. 21, an example data visualization library 2100 is shown. The data visualization library 2100 comprises a user interface component generator 2102, an application endpoint 2104, and a database endpoint 2106. As described above, the user interface component generator 2102 can comprises components of the data visualization tool 112, such as the card/dashboard builder 114, the table rendering component 116, and the conditional formatting component 118. In some embodiments, the user interface component generator 2102 only comprises portions of the card/dashboard builder 114, the table rendering component 116, and the conditional formatting component 118. In some embodiments, the user interface component generator 2102 comprises components that are not present in the card/dashboard builder 114, the table rendering component 116, or the conditional formatting component 118. The user interface component generator 2102 is operatively coupled with the application endpoint 2104 and the database endpoint 2106. As further described below in connection with FIG. 24, the data visualization library 2100, including one or more components of the data visualization library 2100, can be implemented in one or more computing environments. In some embodiments, the data visualization library 2100 can comprise more components than those shown in FIG. 21. For example, the data visualization library can also comprise components described above in connection with FIG. 2.

The data visualization library 2100 can be exportable. For example, the application endpoint 2104 and the database endpoint 2106 can be physical or virtual communication points that facilitate a connection between the data visualization library 2100 and one or more other systems. As an example, the endpoints 2104-2106 can be application programming interfaces (APIs). Furthermore, the data visualization library 2100 can comprise more or fewer endpoints than the endpoints 2104-2106, and the data visualization library 2100 can interact with other systems in ways that are different than the endpoints described herein.

As illustrated in FIG. 21, the data visualization library 2100 can, for example, connect with an application 2108 via the application endpoint 2104. Additionally, the data visualization library 2100 can connect with a plurality of applications via the application endpoint 2104. The application 2108 can, for example, be a third-party application, such as a web application created or operated by a different entity than the entity that created the data visualization library 2100. The data visualization can also, for example, connect with one or more databases 2110 via the database endpoint 2106. Additionally, the one or more databases 2110 can, for example, be third-party databases. By connecting via the endpoints 2104-2106, the data visualization library 2100, including the user interface component generator 2102, can be operatively coupled with the application 2108 and the one or more databases 2110. Consequently, the application 2108 can use the data visualization library 2100 to generate components for a user interface, and the user interface components generated by the user interface component generator 2102 can be integrated into a user interface of the application 2108. Furthermore, in creating such components, the application 2108 can instruct the data visualization library 2100 to use data from the one or more databases 2110.

FIG. 22 illustrates an example method 2200 useable by the data visualization library 2100 and, more specifically, useable by the user interface component generator 2102. The data visualization library 2100 can receive a request to create a user interface component (step 2202). For example, the application 2108 can transmit, via the application endpoint 2104, a request to the user interface component generator 2102, and the user interface component generator 2102 can respond with information fields required to be filled by the application 2108 to create a user interface component. In some embodiments, the request can be a request to edit an existing user interface component of the application 2108.

In the example shown, the user interface component generator 2102 can receive user input (step 2204). For example, the application 2108 can send, via the application endpoint 2104, user input related to generating a user interface component. For example, the user input can include a visualization type, a time range, and one or more databases to be used to generate the user interface component. Furthermore, the user input can relate to one or more calculated fields, as described above, that can be used to generate a visualization of data.

Having received the user input, the user interface component generator 2102 can retrieve component data from the one or more databases 2110 (step 2206). To do so, the user interface generator 2102 can, for example, convert the user input into a database query, send the database query, via the database endpoint 2106, to the one or more databases 2110, and then receive component data from the one or more databases 2110. The component data can relate to the user input received from the application 2108 (e.g., at step 2204). Furthermore, in order to retrieve the component data, the user interface component generator can, as described above in connection with FIG. 2, translate the user input into a data query, package the data query into a query object, and then transmit the query object to the one or more databases 2110.

In the example shown, the user interface component generator 2102 can adjust the component data based on the user input (step 2208). For example, in response to receiving user input related to calculated field information or user input related to adjusting or performing operations on the data received from the databases 2110, the user interface component generator 2102 can perform operations or adjustments on the data. For example, as described above in connection with the table rendering component 116 and the conditional formatting component 118, the user interface component generator 2102 can perform operations on the data received from the one or more databases 2110, thereby creating a flexible dataset including more options as to what data can be included in a data visualization, and thereby limiting the frequency of querying the one or more databases 2110.

In the example shown, the user interface generator 2102 can generate a visualization of data (step 2210). For example, the user interface generator can use any information from the user input (e.g., from step 2204), the component data (e.g., from step 2206), and the adjusted data (e.g., from step 2208) to generate one or more visualizations of data. A visualization of data can be, for example, a graph, a chart, a table, a figure, or a diagram. The visualization of data can also be responsive to user input, thereby allowing the application 2108, for example, to edit the visualization of data or request that the user interface generator 2102 edit the visualization of data. In addition to generating the visualization of data, the user interface component generator 2102 can combine other features with the visualization of data to create a user interface component. For example, the user interface component generator 2102 can add a navigation tool to the visualization of data. A navigation tool can be any tool that assists a user in viewing or using the visualization of data, such as a zoom-in or zoom-out feature, an forward or backward feature if there are a plurality of visualizations of data, an edit feature to send a request to the data visualization library 2100 to edit a visualization of data or create a new visualization of data, a rotate feature, a highlight feature, a hide feature, or any other feature that assists a user in viewing or using the visualization of data.

In the example shown, the user interface generator 2102 can transmit one or more user interface components (step 2212). For example, the user interface generator 2102 can transmit, via the application endpoint 2104, one or more user interface components (generated, e.g., at step 2210) to the application 2108. The application 2108 can then integrate the user interface components into a user interface of the application 2108, an example of which is depicted in FIG. 23.

Referring generally to the method 2200, more or less steps can be present than those depicted in FIG. 22. Furthermore, the order in which the steps are performed can be changed, and the entity performing any of the steps can be different than described above.

Figure 23:
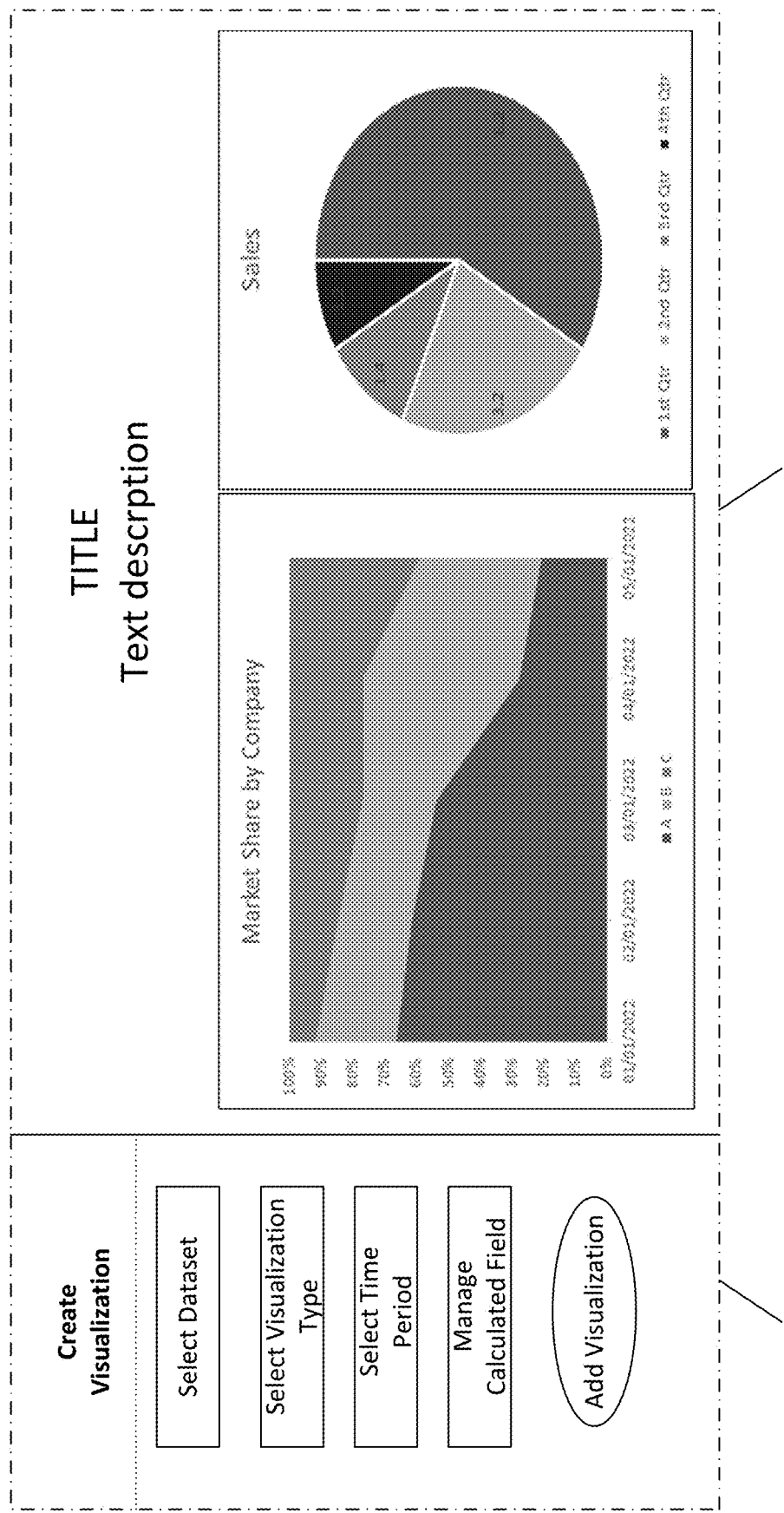
FIG. 23 illustrates an example user interface of an example application operatively connected to a data visualization library, according to an example embodiment.

FIG. 23 illustrates an example application 2300 that uses the data visualization library 2100. The application 2300 is a third-party application that has imported the data visualization library 2100 by connecting with one or more of the endpoints 2104-2106. For example, the application 2300 can be a web-based application comprising a user interface that uses the data visualization library 2100 to generate visualizations.

In the example of FIG. 23, the application 2300 interfaces with the data visualization library 2100 via the create visualization tab 2302. For example, by using the options of the create visualization tab 2302, the application can initiate the method 2200 of FIG. 22. The application 2300 also comprises a data tab 2304 comprising visualizations of data generated by the data visualization library 2100, text, and any other features that are part of the application 2300. In the example of FIG. 23, the data visualization library 2100 can be connected, via the database endpoint 2106, to one or more databases affiliated with the application 2300, or to any other databases.

Figure 24:
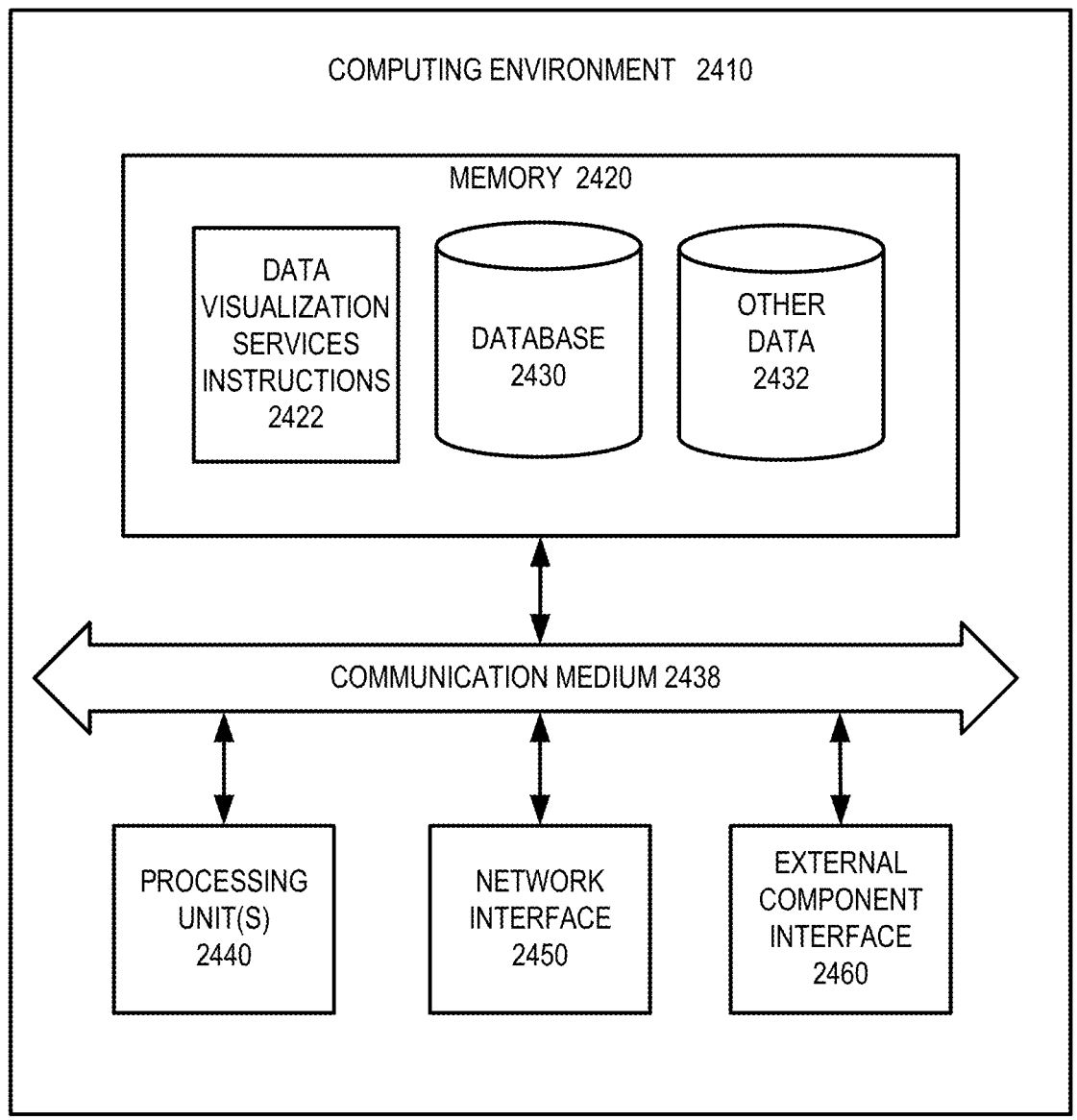
FIG. 24 illustrates an example computing device with which aspects of the present disclosure may be implemented.

FIG. 24 illustrates an example system 2400 with which disclosed systems and methods can be used. In an example, the system 2400 can include a computing environment 2410. The computing environment 2410 can be a physical computing environment, a virtualized computing environment, or a combination thereof. The computing environment 2410 can include memory 2420, a communication medium 2438, one or more processing units 2440, a network interface 2450, and an external component interface 2460.

The memory 2420 can include a computer readable storage medium. The computer storage medium can be a device or article of manufacture that stores data and/or computer-executable instructions. The memory 2420 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 2420 can store various types of data and software. For example, as illustrated, the memory 2420 includes data visualization instructions 2422 for implementing one or more aspects of the data visualization tool described herein, database 2430, as well as other data 2432. In some examples the memory 2420 can include instructions for generating a data visualizations for analysis of organizational data. In some embodiments, the memory 2420 can include instructions for an exportable data visualization library and the data visualization library's components.

The communication medium 2438 can facilitate communication among the components of the computing environment 2410. In an example, the communication medium 2438 can facilitate communication among the memory 2420, the one or more processing units 2440, the network interface 2450, and the external component interface 2460. The communications medium 2438 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 2440 can include physical or virtual units that selectively execute software instructions. In an example, the one or more processing units 2440 can be physical products comprising one or more integrated circuits. The one or more processing units 2440 can be implemented as one or more processing cores. In another example, one or more processing units 2440 are implemented as one or more separate microprocessors. In yet another example embodiment, the one or more processing units 2440 can include an application-specific integrated circuit (ASIC) that provides specific functionality. In yet another example, the one or more processing units 2440 provide specific functionality by using an ASIC and by executing computer-executable instructions.

The network interface 2450 enables the computing environment 2410 to send and receive data from a communication network (e.g., network 16). The network interface 2450 can be implemented as an Ethernet interface, a token-ring network interface, a fiber optic network interface, a wireless network interface (e.g., WI-FI), or another type of network interface.

The external component interface 2460 enables the computing environment 2410 to communicate with external devices. For example, the external component interface 2460 can be a USB interface, Thunderbolt interface, a Lightning interface, a serial port interface, a parallel port interface, a PS/2 interface, and/or another type of interface that enables the computing environment 2410 to communicate with external devices. In various embodiments, the external component interface 2460 enables the computing environment 2410 to communicate with various external components, such as external storage devices, input devices, speakers, modems, media player docks, other computing devices, scanners, digital cameras, and fingerprint readers.

Although illustrated as being components of a single computing environment 2410, the components of the computing environment 2410 can be spread across multiple computing environments 2410. For example, one or more of instructions or data stored on the memory 2420 may be stored partially or entirely in a separate computing environment 2410 that is accessed over a network.

Referring to FIGS. 1-24 overall, it is noted that the methods and systems described herein have a number of advantages over existing systems with respect to generation of data visualizations. For example, the use of the present architecture allows for data visualizations to be generated significantly faster over very large data (billions of records) using the architecture described above. Still further, the graphical user features described herein, including a guided menu for building cards and dashboards, and secure distribution of those cards and dashboards to subscribing users, improve efficiency in both creation and distribution of data visualizations. Still further, the various calculated fields, filters, and column swapping operations described herein may be performed without underlying adjustments to underling data, which makes those operations significantly less time consuming for experienced users while also allowing inexperienced users to readily modify analyses without requiring those users to have familiarity with data structure modification techniques. Other improvements are apparently as well, and illustrated in the present disclosure.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A data display tool comprising:
a processing unit;
a memory communicatively connected to the processing unit, the memory storing instructions including a data visualization library, wherein the instructions, when executed by the processing unit, cause the data display tool to:
generate a user interface, the user interface including a card builder toolset, the card builder toolset including a plurality of selectable options, each of the plurality of selectable options responsive to user input to present a definition screen including one or more card definition input fields;
receive, via one or more of the card definition input fields, user input;
based at least in part on the user input, generate, using the data visualization library, a user interface component comprising a visualization of data;
render a card, wherein the card comprises the user interface component and is included within a dashboard to be displayed to users; and
export the data visualization library to an application.

2. The data display tool of claim 1, wherein exporting the data visualization library to the application comprises exporting a subset of the data visualization library to the application.

3. The data display tool of claim 1, wherein the visualization of data is one or more of a chart, a graph, a table, a figure, or a diagram, and wherein the card comprises the visualization of data.

4. The data display tool of claim 1, wherein the user interface component further comprises a navigation tool.

5. The data display tool of claim 1 wherein the instructions, when executed, further cause the data display tool to:
display a drill-through tool useable to define an interrelationship among a plurality of cards renderable within the dashboard; and
in response to receiving a selection of a first user interface component in a first card among the plurality of cards, displaying a second card of the plurality of cards, the second card showing a different user interface component to the user based on the interrelationship defined among the plurality of cards;
wherein one or more of the first user interface component and the second user interface component is generated by the data visualization library.

6. A data visualization system comprising:
a processing unit; and
a memory communicatively connected to the processing unit, the memory storing instructions including a data visualization library, wherein the instructions, when executed by the processing unit, cause the data visualization system to:
generate a user interface, the user interface including a canvas and a card builder toolset, the card builder toolset including a plurality of selectable options, each of the plurality of selectable options responsive to user input to present a definition screen including one or more card definition parameter input fields;
receive, via one or more of the card definition parameter input fields, user input;
based at least in part on the user input, generate, using the data visualization library, a user interface component comprising a visualization of data;
render a card, wherein the card comprises the user interface component and is included within the dashboard to be displayed to users; and
export the data visualization library to an application;
wherein the data visualization library comprises an application endpoint, a database endpoint, and a user interface component generator.

7. The data visualization system of claim 6,
wherein the user interface component generator is operatively connected, via the application endpoint, to an application;
wherein the user interface component generator is operatively connected, via the database endpoint, to a database;
wherein the memory further stores visualization instructions, wherein the visualization instructions, when executed by the processing unit, cause the user interface component generator to: convert the user input to a database query; transmit the database query to the database; receive component data from the database; and generate, using the component data, the user interface component;
wherein the user input comprises one or more of a selected dataset, a visualization type, a time range, and calculated field information; and
wherein the application comprises the user interface.

8. The data visualization system of claim 6, wherein the application belongs to a third-party system.

9. The data display tool of claim 1, wherein the plurality of selectable options includes a dataset option, a chart option, a time period option, a filter option, and a card or dashboard details option.

10. The data display tool of claim 1, wherein the data visualization library, after being exported to the application, is configured to:
receive, from the application, a second input;
generate a database query based at least in part on the second input;
transmit the database query to a database;
receive component data from the database; and
based at least in part on the component data, generate a second user interface component comprising a second visualization of data.

11. The data display tool of claim 10,
wherein the second input is the user input;
wherein the second user interface component is the user interface component; and
wherein the second visualization of data is the visualization of data.

12. The data display tool of claim 10, wherein the second user interface component is integrated into a user interface of the application and the second visualization is displayed in the user interface of the application.

13. The data display tool of claim 10, wherein transmitting the database query to the database comprises selecting the database from a plurality of databases based on a selected dataset in the second input.

14. The data display tool of claim 1, wherein the application is a third-party application.

15. The data display tool of claim 1,
wherein the user interface component is responsive to an updated user input; and
wherein, in response to the updated user input, the data visualization library is configured to alter the user interface component or generate an updated user interface component.

16. The data display tool of claim 1, wherein the user input comprises one or more of database selection, a visualization type, or calculated field information.

17. The data display tool of claim 1, wherein generating the user interface component comprises altering, based on the calculated field information, data in the visualization of data.

18. The data display tool of claim 1, wherein exporting the data visualization library to the application comprises:
receiving a selection of functions of the data visualization library; and
exporting the selected functions of the data visualization library to the application.

19. The data display tool of claim 1, wherein exporting the data visualization library to the application comprises exposing one or more application programming interfaces (APIs) of the data visualization library to the application.

20. The data display tool of claim 1,
wherein the application is a web application; and
wherein exporting the data visualization library to the application comprises providing an application endpoint of the data visualization library to the application.

* * * * *